(12) United States Patent
Green et al.

(10) Patent No.: US 9,907,237 B2
(45) Date of Patent: Mar. 6, 2018

(54) CUTTING ASSEMBLY FOR A STUMP CUTTING APPARATUS

(71) Applicants: Kevin J. Green, Blissfield, MI (US); Brian P. Holly, Onsted, MI (US)

(72) Inventors: Kevin J. Green, Blissfield, MI (US); Brian P. Holly, Onsted, MI (US)

(73) Assignee: Green Manufacturing, Inc., Morenci, MI (US)

( * ) Notice: Subject to any disclaimer, the term of this patent is extended or adjusted under 35 U.S.C. 154(b) by 916 days.

(21) Appl. No.: 14/214,987

(22) Filed: Mar. 16, 2014

(65) Prior Publication Data

US 2014/0338791 A1    Nov. 20, 2014

Related U.S. Application Data

(60) Provisional application No. 61/791,884, filed on Mar. 15, 2013.

(51) Int. Cl.
*A01G 23/06* (2006.01)
*B27G 17/08* (2006.01)
*B27G 13/08* (2006.01)

(52) U.S. Cl.
CPC .......... *A01G 23/067* (2013.01); *B27G 13/08* (2013.01)

(58) Field of Classification Search
CPC ...... A01G 23/067; B27G 13/02; B27G 13/04; B27G 13/08; B27G 13/10; B23C 5/02; B23C 5/04; B23C 5/2204; B23C 5/2239; B23C 5/20; B23C 5/22; B23C 2210/244; B23C 2210/16; B23C 2210/168; B23C 5/08

USPC ......................................................... 144/235
See application file for complete search history.

(56) References Cited

U.S. PATENT DOCUMENTS

| | | |
|---|---|---|
| 1,646,813 A | 10/1927 | Davey et al. |
| 2,996,291 A | 8/1961 | Krekeler |
| 3,256,043 A | 6/1966 | Krekeler |
| 3,570,566 A | 3/1971 | Mccreery |
| 3,797,544 A | 3/1974 | Ver Ploeg |
| 3,844,619 A | 10/1974 | Haller |
| 3,935,887 A * | 2/1976 | Van Zante ........... A01G 23/067 144/235 |
| 4,343,516 A | 8/1982 | Aden |
| 4,506,715 A | 3/1985 | Blackwell |
| 4,536,037 A | 8/1985 | Rink |
| 4,738,291 A | 4/1988 | Isley |
| 4,744,278 A | 5/1988 | Wright |
| 4,750,396 A | 6/1988 | Gaddis et al. |
| 4,759,394 A | 7/1988 | Clemenson |

(Continued)

FOREIGN PATENT DOCUMENTS

| | | |
|---|---|---|
| EP | 2659768 A1 | 11/2013 |
| EP | 2727673 A1 | 5/2014 |

(Continued)

*Primary Examiner* — Shelley Self
*Assistant Examiner* — Smith O Bapthelus
(74) *Attorney, Agent, or Firm* — Endurance Law Group PLC

(57) ABSTRACT

A cutting assembly for use with a stump cutting apparatus. Cutting assembly including a plurality of tool holders and cutting tools supported in said tool holders. The tool holders placed in a side-by-side relationship on at least one side of the cutting wheel. Further, in an alternative example a single tool holder supports multiple cutting tools.

12 Claims, 25 Drawing Sheets

(56) References Cited

U.S. PATENT DOCUMENTS

| | | | |
|---|---|---|---|
| 4,812,087 | A | 3/1989 | Stashko |
| 4,827,995 | A | 5/1989 | Wilson |
| 4,932,447 | A | 6/1990 | Morin |
| 4,974,649 | A | 12/1990 | Manning |
| 4,998,574 | A | 3/1991 | Beach et al. |
| 5,005,622 | A | 4/1991 | Beach et al. |
| 5,042,733 | A | 8/1991 | Hench |
| 5,063,731 | A | 11/1991 | Hull et al. |
| 5,131,305 | A * | 7/1992 | MacLennan ......... B23D 61/065 83/840 |
| 5,135,035 | A | 8/1992 | Mills |
| 5,201,352 | A | 4/1993 | Hult |
| 5,203,388 | A | 4/1993 | Bowling |
| 5,205,199 | A | 4/1993 | MacLennan |
| 5,211,212 | A | 5/1993 | Carlson et al. |
| 5,248,188 | A | 9/1993 | Walgren |
| 5,261,306 | A | 11/1993 | Morey et al. |
| 5,269,355 | A | 12/1993 | Bowen |
| 5,279,345 | A | 1/1994 | LeMaux et al. |
| 5,289,859 | A | 3/1994 | Minton et al. |
| 5,318,351 | A | 6/1994 | Walker |
| 5,363,891 | A | 11/1994 | Plante |
| 5,365,986 | A | 11/1994 | Hooser |
| 5,381,840 | A | 1/1995 | Bowen |
| 5,497,815 | A | 3/1996 | Bowling |
| 5,623,979 | A | 4/1997 | Bowling |
| 5,645,323 | A | 7/1997 | Beach |
| 5,685,672 | A | 11/1997 | Tjernstrom |
| 5,743,314 | A | 4/1998 | Puch |
| 5,819,827 | A | 10/1998 | Leonardi |
| 5,934,842 | A | 8/1999 | Gupta |
| 6,024,143 | A | 2/2000 | Ritchey |
| 6,089,480 | A | 7/2000 | Rawlings |
| 6,138,725 | A | 10/2000 | Leonardi et al. |
| 6,164,878 | A | 12/2000 | Satran et al. |
| 6,213,931 | B1 * | 4/2001 | Twardowski ........ A01G 23/067 125/3 |
| 6,299,389 | B1 | 10/2001 | Barazani |
| 6,382,277 | B1 | 5/2002 | Paumier et al. |
| 6,484,766 | B1 | 11/2002 | Falatok et al. |
| 6,877,535 | B1 | 4/2005 | Bennington |
| 7,299,836 | B2 | 11/2007 | Green |
| 7,380,889 | B2 | 6/2008 | Frear |
| 7,418,986 | B2 * | 9/2008 | Watts .................... B02C 18/184 144/24.12 |
| 7,484,541 | B2 * | 2/2009 | Green ................. A01G 23/067 144/24.12 |
| 8,020,591 | B2 * | 9/2011 | Kappel ............... A01G 23/067 144/235 |
| 8,573,903 | B2 | 11/2013 | Morrison et al. |
| 8,672,001 | B2 | 3/2014 | Leonardi et al. |
| 8,789,566 | B2 | 7/2014 | Leonardi et al. |
| 9,186,733 | B2 | 11/2015 | Riviere et al. |
| 2005/0217756 | A1 | 10/2005 | Cao |
| 2006/0102247 | A1 | 5/2006 | Green |
| 2008/0149224 | A1 | 6/2008 | Kappel et al. |
| 2008/0190519 | A1 | 8/2008 | Green |
| 2008/0196791 | A1 | 8/2008 | Gossett |
| 2012/0070240 | A1 | 3/2012 | Ishi et al. |
| 2016/0067797 | A1 | 3/2016 | Deguchi |

FOREIGN PATENT DOCUMENTS

| | | |
|---|---|---|
| EP | 2832477 | 11/2015 |
| WO | 2013002341 A1 | 1/2013 |
| WO | 2013146211 A1 | 10/2013 |

* cited by examiner

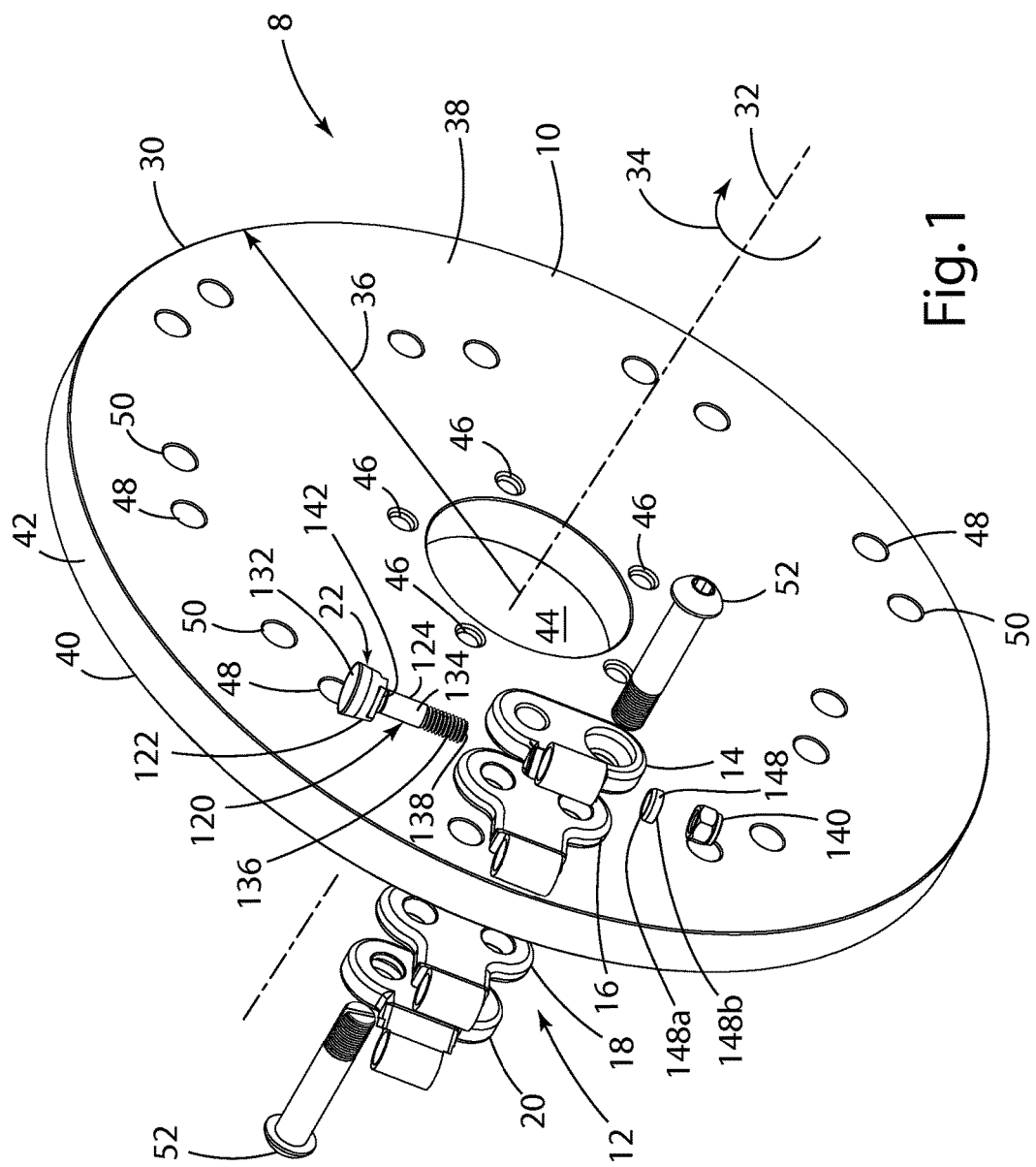

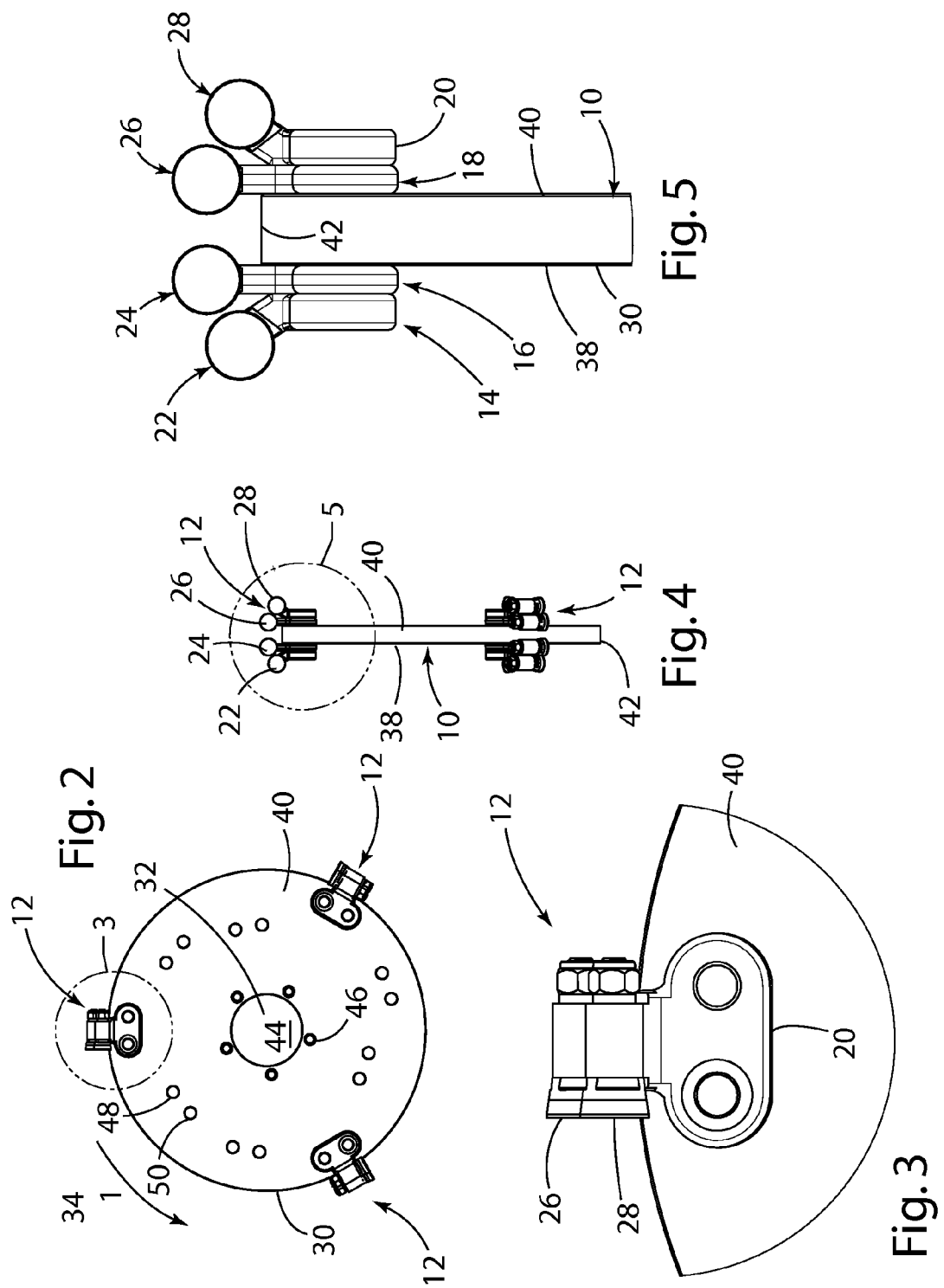

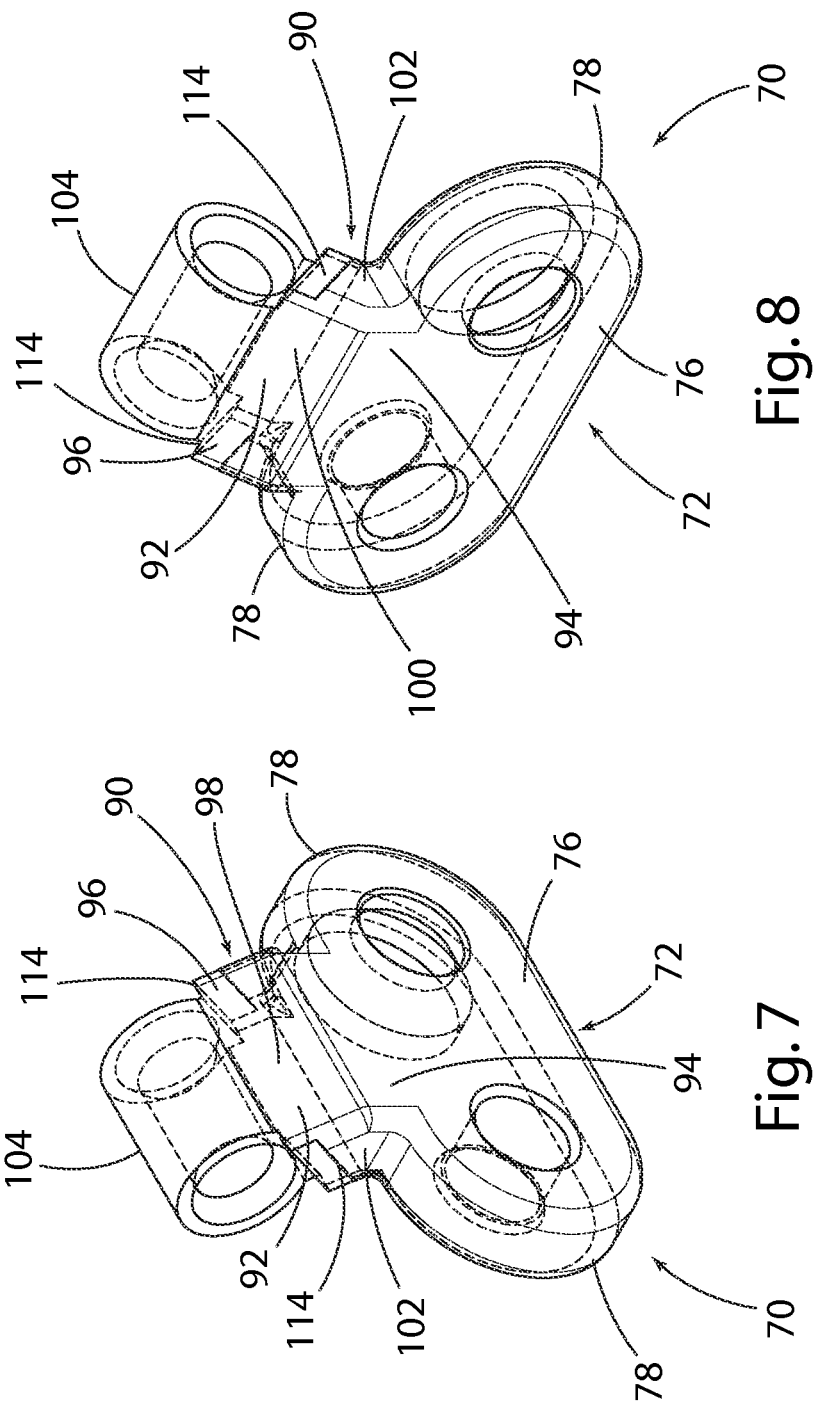

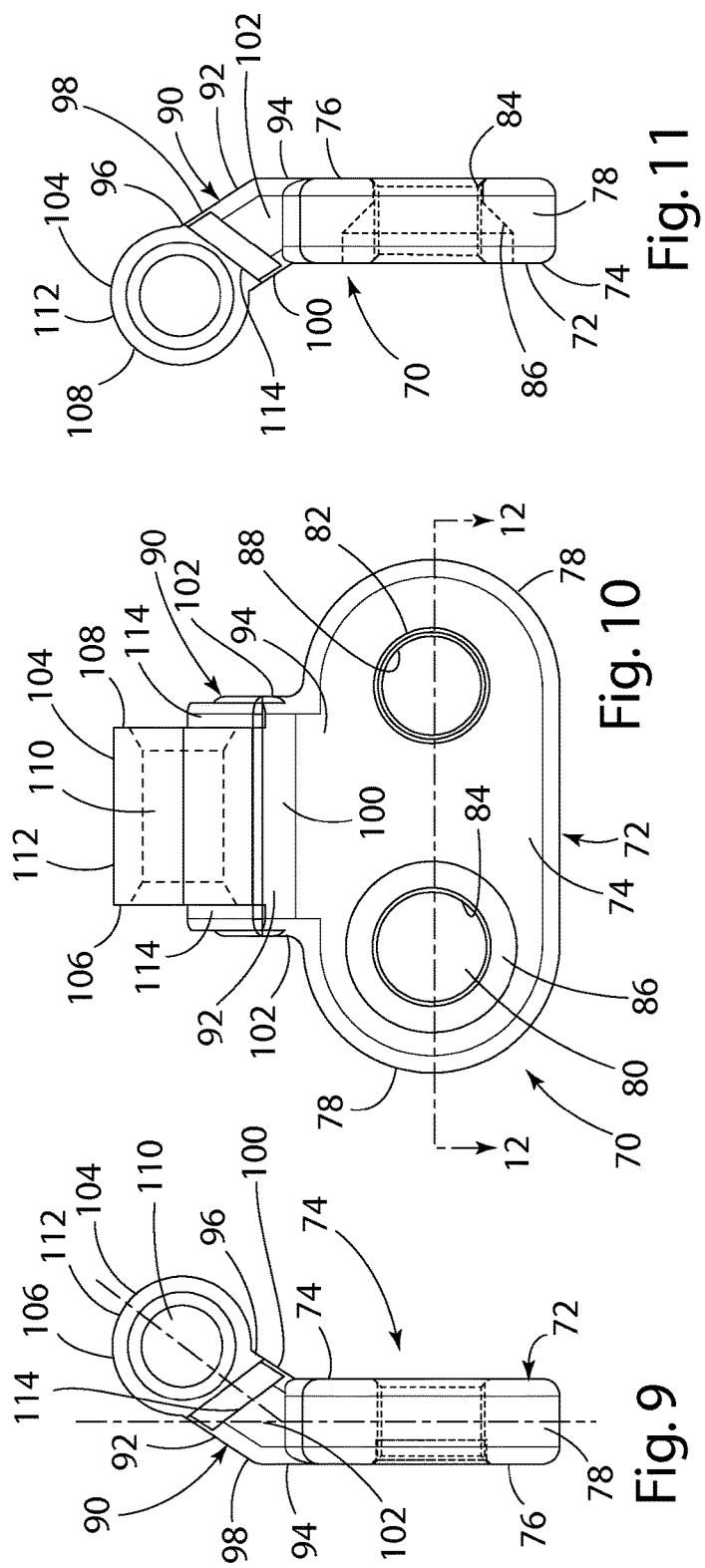

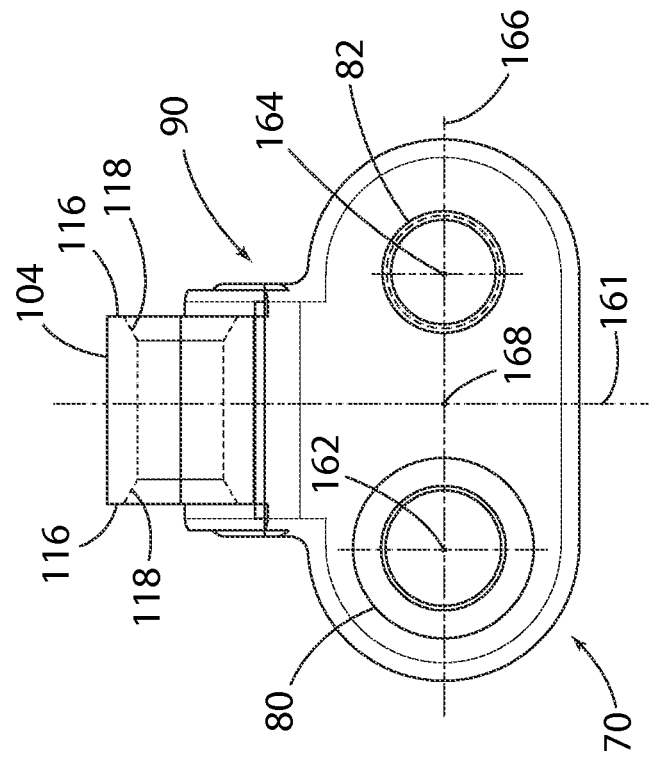
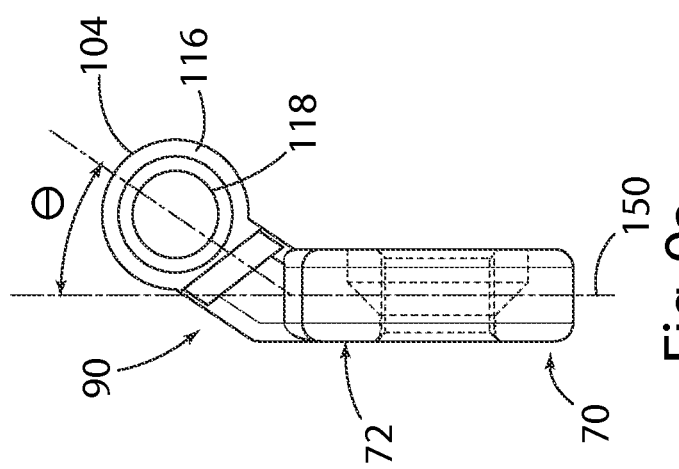
Fig. 10a
Fig. 9a

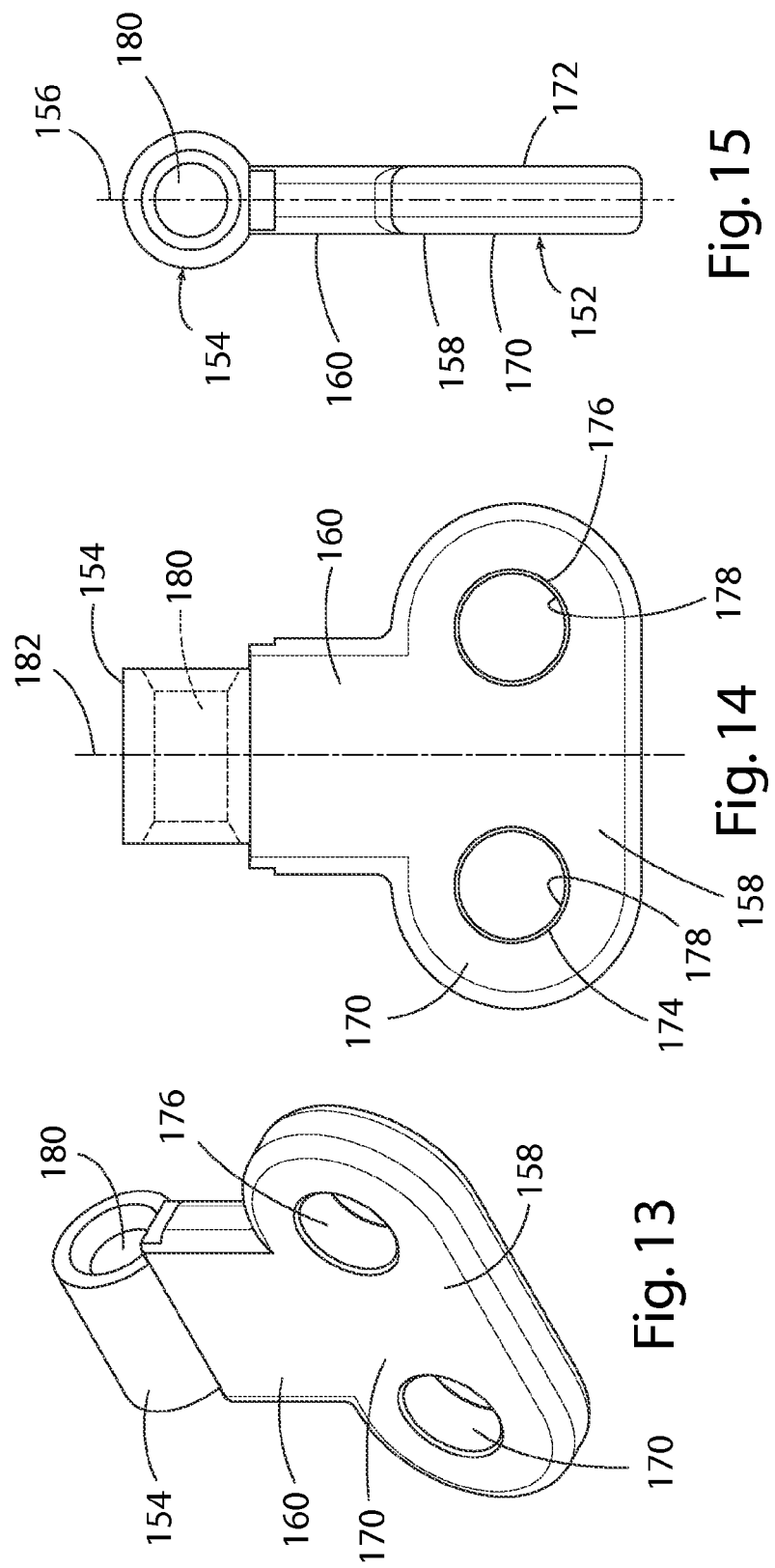

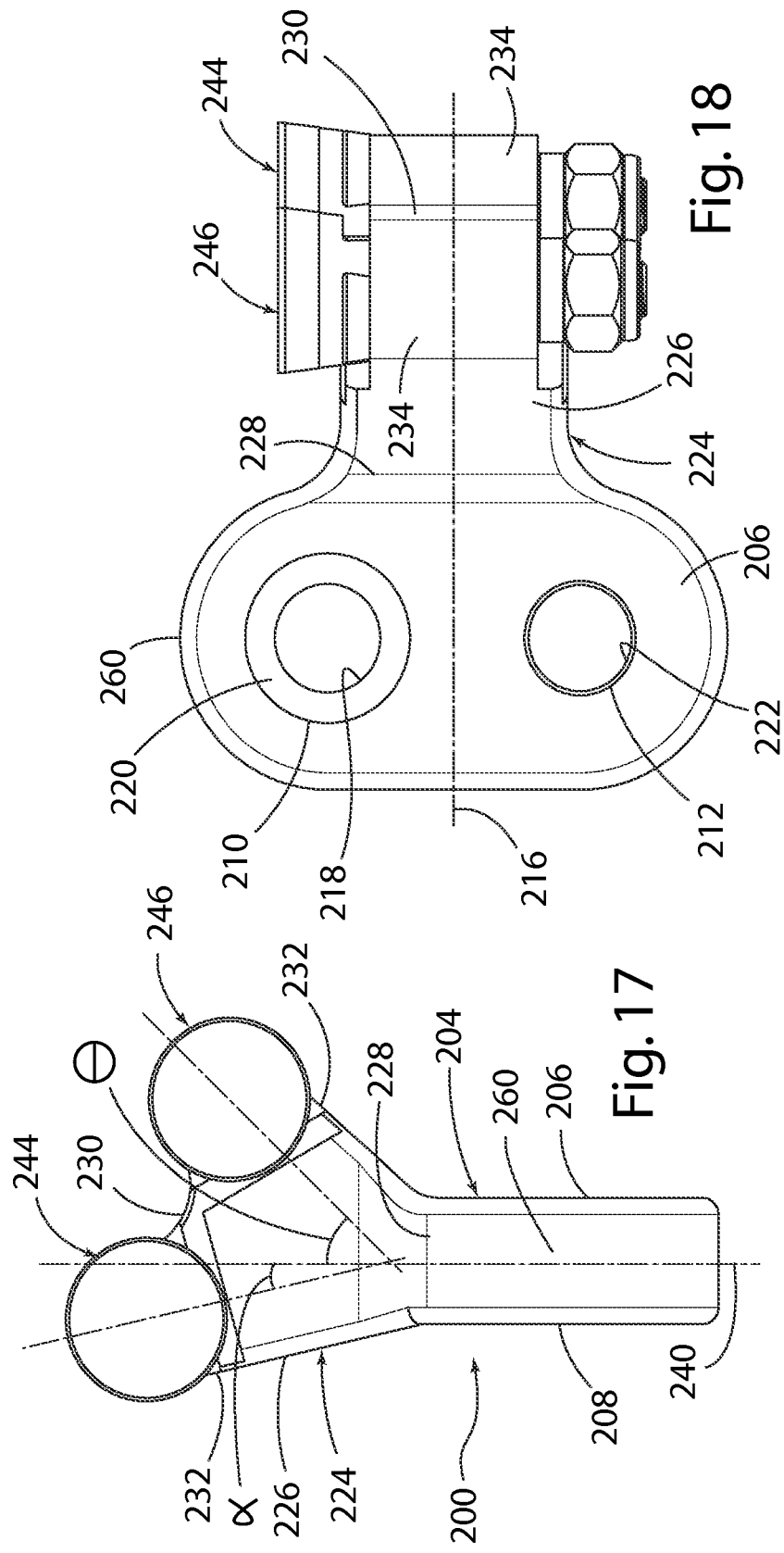

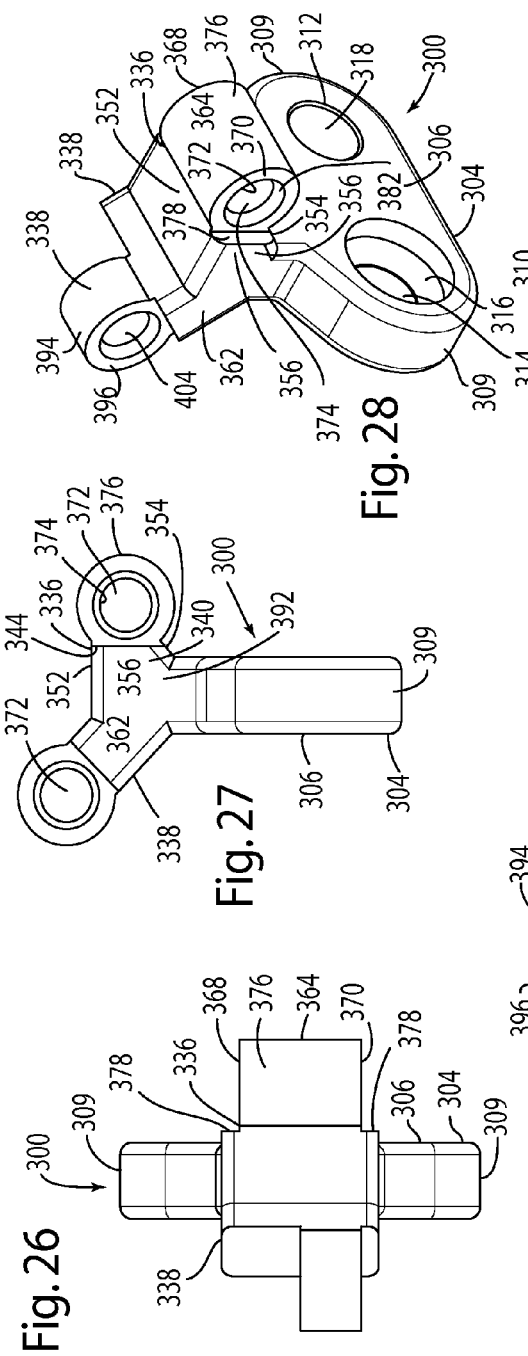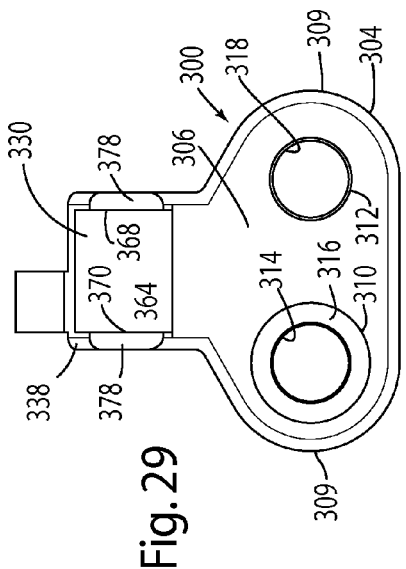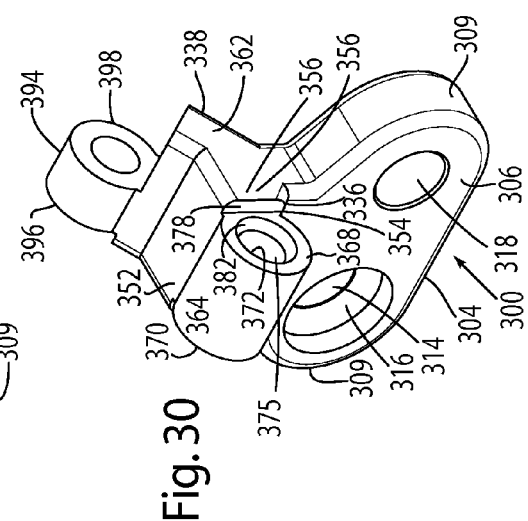

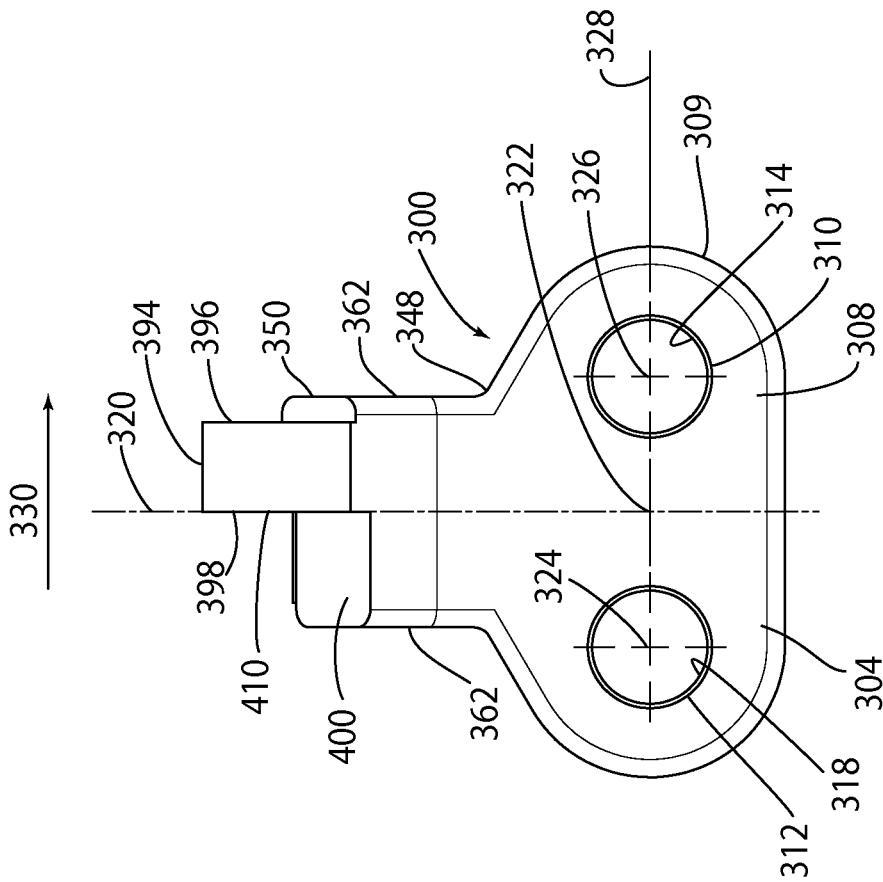
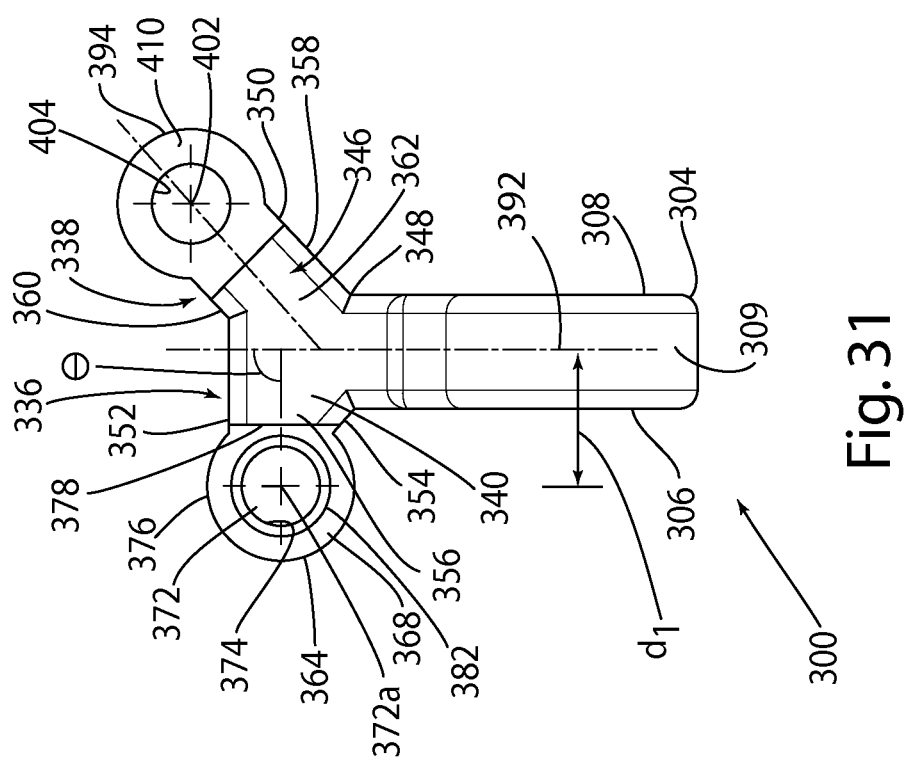

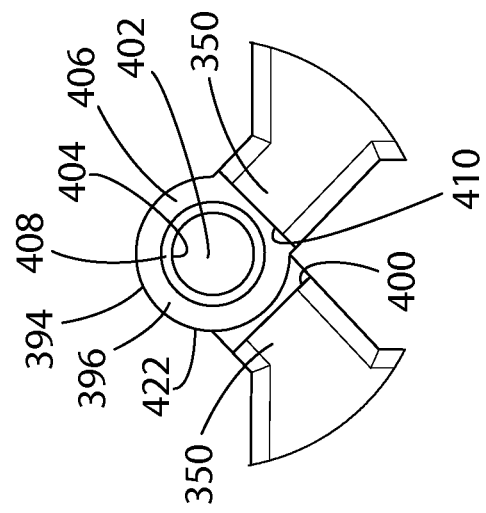
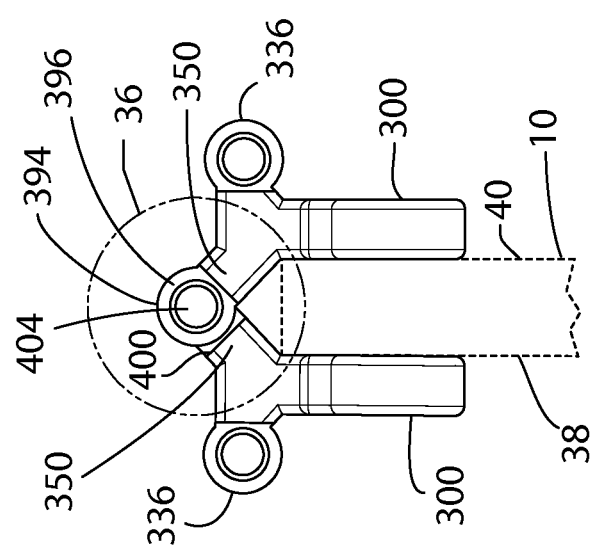

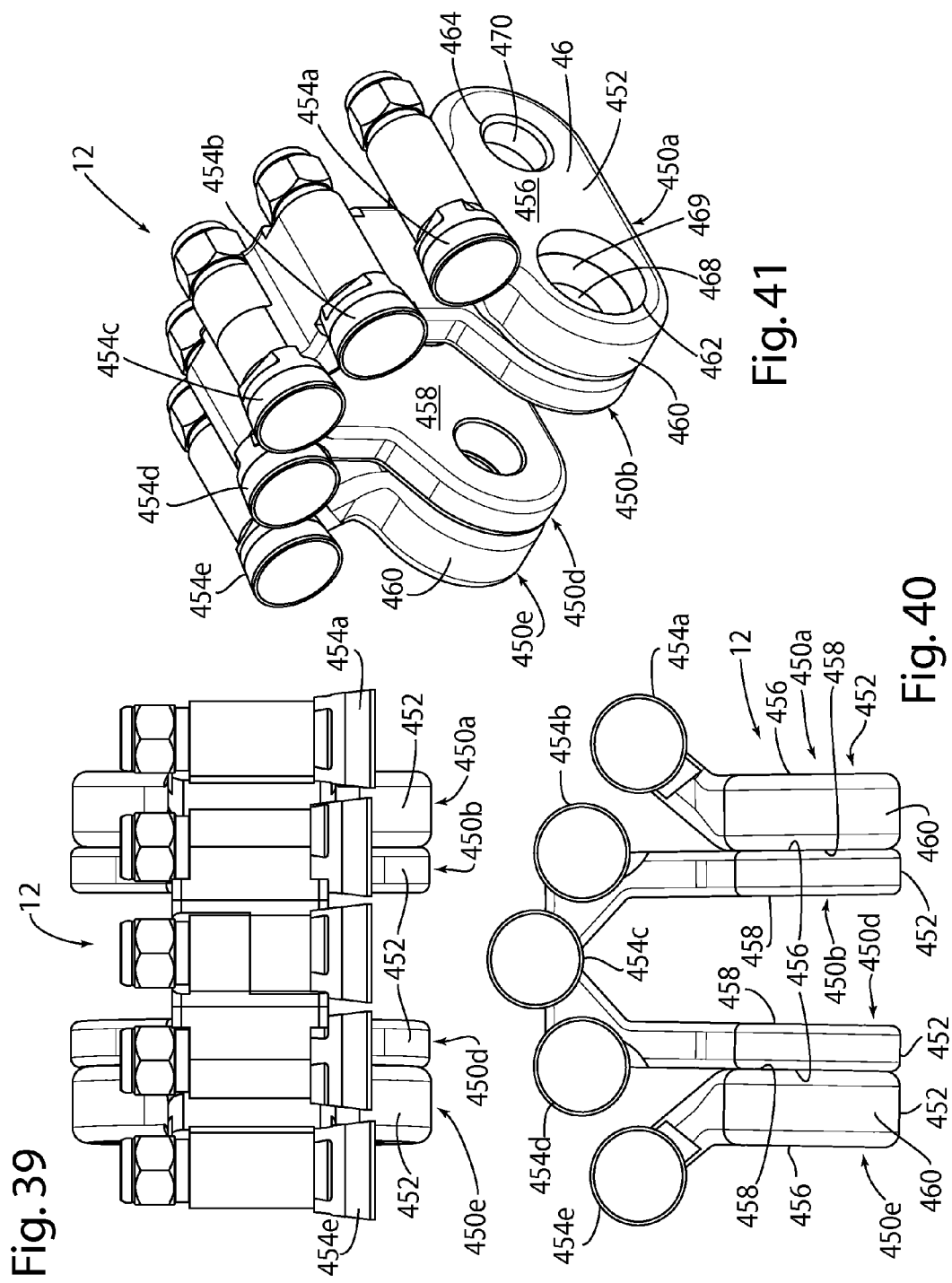

CUTTING ASSEMBLY FOR A STUMP CUTTING APPARATUS

CROSS-REFERENCE TO RELATED APPLICATIONS

This application claims the benefit of U.S. Provisional Application No. 61/791,884, filed Mar. 15, 2013.

BACKGROUND OF THE INVENTION

1. Field of the Invention

The present invention relates generally to a stump cutting apparatus and, more specifically, to a tool holder and cutting tool for use with a stump cutting apparatus.

2. Description of Related Art

Various types of stump cutting devices are known. One type includes a rotatable wheel or disk having a plurality of cutting tools fastened adjacent a peripheral edge. A second type includes a rotatable drum having a plurality of cutting tools fastened adjacent to or on an outer circumferential surface. During operation, as the wheel or drum rotates the cutting tools engage and cut the stump. Each type uses a multitude of various cutting tool styles and configurations. A cutting tool typically includes a tool holder secured to the cutting wheel or drum and a cutting tooth secured to the tool holder.

Some stump cutting devices use a pair of tool holders, sometimes referred to as pockets or mounting blocks, attached across from each other on opposite sides of the wheel. Each tool holder typically includes a pair of apertures used for mounting or securing the tool holder to the wheel. Various configurations can be used including the tool holder having two counter bored apertures with the opposite or corresponding tool holder having two threaded apertures. Each tool holder could have one counter bored aperture and one threaded aperture.

A fastener, such as a bolt or screw, extends through the counter bored aperture in the tool holder, an aperture in the wheel and threadably engages the threaded aperture on the opposite pocket. Tightening the fastener draws the opposing tool holders together such that they sandwich the wheel between them.

Tool holders support and secure a cutting tooth to the wheel. Depending upon the cutting tooth design or style a carbide-cutting bit is attached to the cutting tooth. Since stump cutting teeth typically operate in a harsh environment, contact with the ground surface rapidly dulls the cutting edge of each cutting tooth. When a cutting tooth strikes something hard such as a stone or rock the cutting bit or an edge may break or chip requiring replacement of the cutting tooth. Finally, continuous loading of the cutting tooth can cause cutting tooth failure including twisting or bending of the shank portion. In some instances, the tooth itself may break thus necessitating replacement. Replacement of the cutting teeth is or can be an almost continuous job. Cutting tooth replacement is costly both in material replacement costs and in associated man-hours necessary to remove and install each individual new cutting tooth. Further, depending upon the load applied to the cutting tool during the stump cutting operation, the fastener securing the tool holder to the wheel may break or shear.

SUMMARY OF THE INVENTION

A cutting assembly for use with a stump cutting apparatus, the cutting assembly including multiple tool holders and multiple cutting tools. In one example of an embodiment of the invention, multiple tool holders are secured to each side of the cutting wheel with each tool holder supporting a cutting tool.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a cutting wheel assembly having multiple tool holders according to one embodiment of the present invention.

FIG. 2 is a side view of a cutting wheel assembly as set forth in FIG. 1.

FIG. 3 is an enlarged side view of the cutting wheel assembly taken in circle 3 of FIG. 2.

FIG. 4 is a front view of a cutting wheel assembly as set forth in FIG. 1.

FIG. 5 is an enlarged front view of the cutting wheel assembly taken in circle 5 of FIG. 4.

FIG. 7 is a perspective view of a tool holder for use with the cutting wheel assembly of FIG. 1.

FIG. 8 is a perspective view of the tool holder in FIG. 7 rotated 180°.

FIG. 9 is a front view of the tool holder of FIG. 7.

FIG. 9a is a front view of the tool holder of FIG. 7 illustrating an offset angle.

FIG. 10 is a side view of the tool holder of FIG. 7.

FIG. 10a is a side view of the tool holder of FIG. 7 illustrating the symmetrical configuration of the tool holder.

FIG. 11 is a rear view of the tool holder of FIG. 7.

FIG. 12a is a cross-sectional view taken along lines 12-12 of FIG. 10, FIGS. 12b-12e illustrate alternative cross-sectional shapes or configurations.

FIG. 13 is a perspective view of a tool holder for use with the cutting wheel assembly of FIG. 1.

FIG. 14 is a side view of the tool holder of FIG. 13.

FIG. 15 is a front view of the tool holder of FIG. 13.

FIG. 17 is a front view of a tool holder for use with the cutting wheel assembly of FIG. 16.

FIG. 18 is a side view of the tool holder of FIG. 17.

FIG. 26 is a top view of a tool holder of the cutting tool assembly of FIG. 22.

FIG. 27 is a front view of a tool holder of the cutting tool assembly of FIG. 22.

FIG. 28 is a perspective view of a tool holder of the cutting tool assembly of FIG. 22.

FIG. 29 is a side view of a tool holder of the cutting tool assembly of FIG. 22.

FIG. 30 is a perspective view of a tool holder of the cutting tool assembly of FIG. 22 rotated 90° from that shown in FIG. 28.

FIG. 31 is a side view of the tool holder of the cutting tool assembly of FIG. 22.

FIG. 32 is a front view of the tool holder of the cutting tool assembly of FIG. 22.

FIG. 35 is a front view of the tool holders of the cutting tool assembly of FIG. 22.

FIG. 36 is an enlarged front view of the tool holders of the cutting tool assembly of FIG. 22 taken in circle 35 of FIG. 35.

FIG. 39 is a top view of a cutting tool assembly for use with the cutting wheel assembly of FIG. 38.

FIG. 40 is a front view of a cutting tool assembly for use with the cutting wheel assembly of FIG. 38.

FIG. 41 is a perspective view of a cutting tool assembly for use with the cutting wheel assembly of FIG. 38.

DETAILED DESCRIPTION OF THE PREFERRED EMBODIMENTS

Figure 5A:
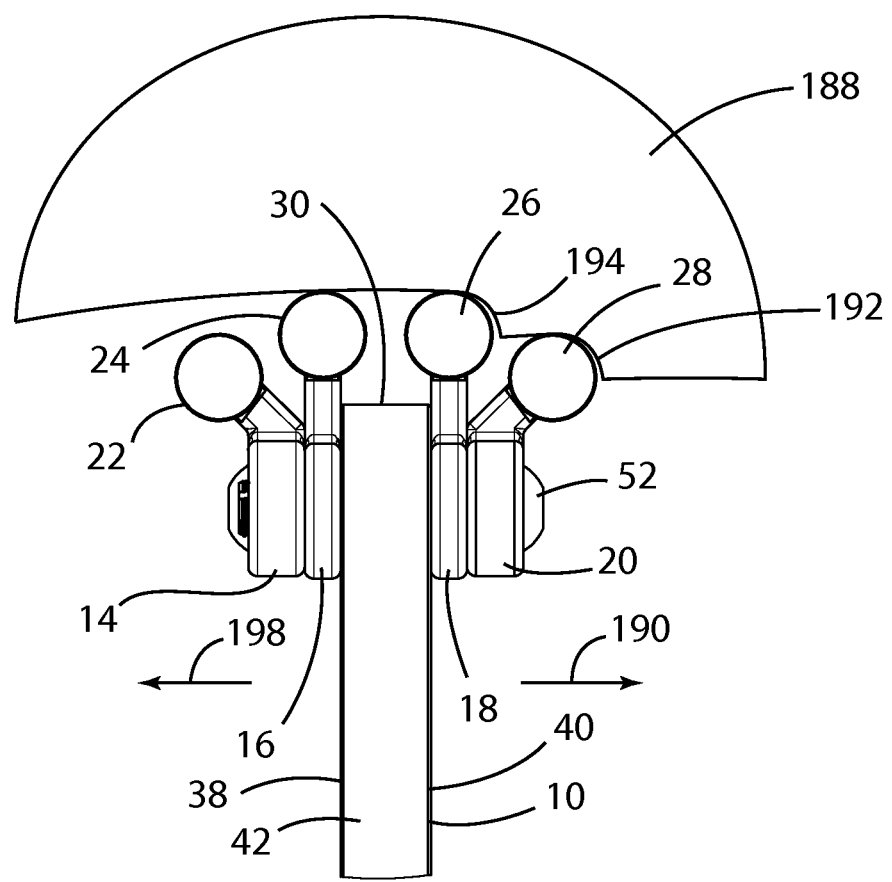
FIG. 5a is an enlarged front view of the cutting wheel assembly of FIG. 5 shows an engaging a stump
Figure 6:
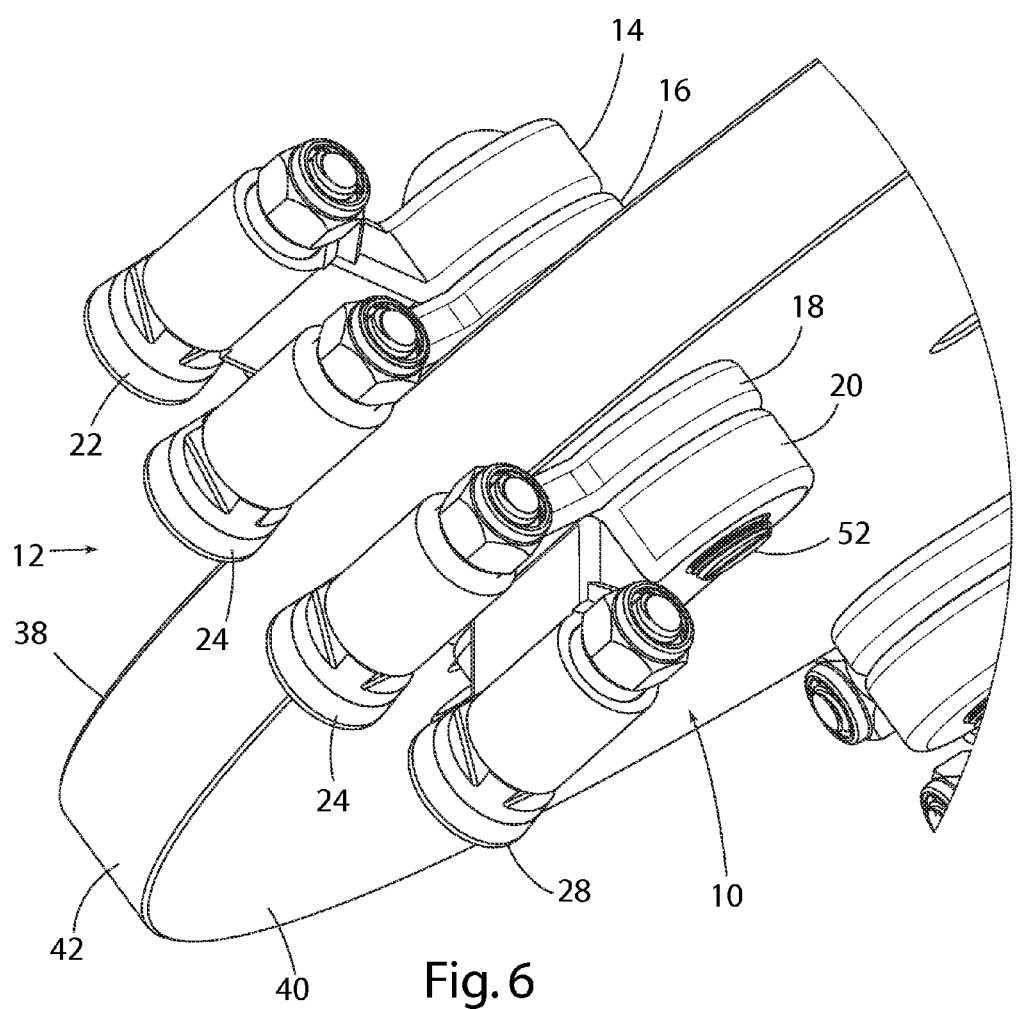
FIG. 6 is an enlarged top, partial perspective view of the cutting wheel assembly of FIG. 1.

The following description of the preferred embodiment(s) is merely exemplary in nature and is not intended to limit the invention, its application, or uses.

FIGS. 1-15 illustrate a stump cutting apparatus, seen generally at 8, according to one embodiment of the present invention. The stump cutting apparatus 8 includes a wheel 10 and a cutting assembly 12 including a plurality of tool holders 14, 16, 18, and 20 and a plurality of cutting tools or cutting teeth 22, 24, 26 and 28 secured to respective tool holders 14, 16, 18, and 20. As illustrated, the cutting tools 22, 24, 26 and 28 are located about the periphery or peripheral edge 30 of the wheel 10.

The wheel 10 is a plate-like disk member having a generally circular shape mounted for rotation about an axis 32 in the direction of the arrow 34. The generally circular shape is defined by a radius or radial 36 rotated about the axis 32. The wheel 10 includes opposite or opposing side surfaces 38, 40 and a generally arcuate outer surface 42 at the periphery or peripheral edge 30 of the wheel 10. The wheel 10 further includes a central aperture 44 surrounded by a plurality of smaller apertures 46 suitable for securing the wheel 10 to a stump grinding machine. The area or portion of the wheel 10 located about or around the central aperture 44 is generally termed the hub. The wheel 10 further includes a multiple pairs of spaced apertures 48, 50 extending through the wheel 10 between the respective side surfaces 38, 40. The spaced apertures 48, 50 are used to secure the respective tool holders 14, 16, 18, and 20 to the wheel 10.

The tool holders 14, 16, 18, and 20 may be mounted about the outer peripheral edge 30 of the wheel 10 and may be mounted on the respective side surfaces 38, 40 of the wheel 10. Sometimes the tool holders 14, 16, 18, and 20 may be mounted on the respective side surfaces 38, 40 of the wheel 10 in a helical pattern relative to the axis 32 of rotation of the wheel 10 using additional pairs of spaced apertures 48, 50 on the wheel 10 in a generally helical pattern.

As illustrated in one embodiment of the present invention, the cutting assembly, seen generally at 12, includes a pair tool holders 14, 16 on one side surface 38 of the wheel 10 and a pair of tool holders 18, 20 on the opposite side surface 40 of the wheel 10. A threaded fastener 52 extends through the respective tool holders 14, 16, 18, and 20 and the spaced apertures 48, 50 in the wheel 10. Tightening the threaded fastener 52 draws the respective tool holders 14, 16, 18, and 20 together and sandwiches the wheel 10 between the innermost tool holders 18, 20 positioned on the respective sides 38, 40 of the wheel 10 to secure the tool holders 14, 16, 18, and 20 to the wheel 10. While the present embodiment uses two bolts or threaded fasteners 52 to secure the tool holders 14, 16, 18, and 20 to the wheel 10 additional fasteners can also be used.

FIGS. 7-15 illustrate the respective inner tool holders 16, 18 and outer tool holders 14, 20. FIGS. 7-12 illustrate one example of an outer tool holder 70 suitable for the present invention. The outer tool holder 70 includes a wheel or base portion 72 having a front or outer surface 74 and a rear or inner surface 76. The rear or inner surface 76 is the surface closer to the wheel 10 when the tool holder 70 is attached to the wheel 10. A side surface 78 connects the respective outer and inner surfaces 74, 76. While the respective outer and inner surfaces 74, 76 are generally planar and extend parallel to the respective side surfaces 38, 40 of the wheel 10 the side surface 78 of the tool holder 70 may have a multitude of configurations including arcuate, beveled, curved, parabolic or other shapes as illustrated in FIGS. 12a-12e. FIG. 12a is a cross-section taken along lines 12a-12a of FIG. 10 and FIGS. 12b-12e are alternative cross-sections illustrating shapes or configurations of the outer tool holder 70. In an additional embodiment, the outer surface 74 of the outer tool holder 70 may have a surface less than that of inner surface 76 leading to a configuration as illustrated in FIG. 12d; specifically, the base portion 72 of the tool holder 70 has a substantially trapezoidal shaped cross-sectional configuration. The configuration of the side surface 78 suitable for chip management; i.e., different configurations of the side surface 78 will cause the side surface 78 to interact with and broadcast the chips in a different manner as the outer tool holder 70 contacts the chip pile during the grinding operation. Curving or beveling the side surface 78 helps to push the chips to the side or laterally away from the wheel 10 rather than raking them rearwardly toward the machine/operator.

The outer tool holder 70 further includes a pair of apertures 80, 82 extending therethrough from the outer surface 74 to the inner surface 76. The apertures 80, 82 in connection with the fasteners 52 secure the outer tool holder 72 the wheel 10. As illustrated, the aperture 80 includes a smooth bore portion 84 and a countersunk portion 86. The countersunk portion 86 located adjacent the outer surface 74 of the outer tool holder 70 extends inwardly to the smooth bore portion 84. Aperture 82 includes a threaded bore 88 extending between the outer surface 74 and inner surface 76 of the outer tool holder 70. The respective apertures 80, 82 are configured to receive fasteners 52 used to secure the outer tool holder 70 to the wheel 10.

The outer tool holder 70 may also include a tool portion, seen generally at 90. The tool portion 90 includes a neck or support member 92 having a proximal end 94 connected to the wheel or base portion 72 and a distal end 96 located opposite the proximal end 94. Similar to the wheel or base portion 72, the neck 92 includes an inner surface 98 and an outer surface 100 along with opposing side surfaces 102 extending between the respective inner surface 98 and outer surface 100. Similar to the wheel or base portion 72, the tool portion 90 may have various cross-sectional configurations to minimize the profile of the tool portion 90 regarding the chip pile. Again, the tool portion may have a cross-section similar to that as illustrated in FIGS. 12a-12e. As with the base portion 72 of the outer tool holder 70, the size or area of the outer surface 100 of the neck 92 may be less than the size or area of the inner surface 98 whereby the neck 92 has a cross-section having a generally trapezoidal configuration, similar to that illustrated in FIG. 12d. As with the side surfaces 78 of the base portion 92, the side surfaces 102 of the neck 92 may also have or be configured as an arcuate surface or a parabolic surface. Providing such a curvature or swept configuration for the respective edges or side surfaces 102 of the neck 92 also minimizes chip broadcasting and requires less energy to drive or push the tool holder 70 through the chip pile and any debris encountered during the stump cutting or grinding operation.

While the curvature or side surface 100 configuration may start at the inner surface 98 of the neck 92 of the side surface 102 may have a slope, taper, curve or radius of curvature starting at the midpoint or center of the side surface 102 and extending back to both the inner and outer surface 98, 100. Besides a curved or arcuate surface, the side surfaces 102 of the neck 92 may also be flat or planar and slope from a leading point, edge or surface on the neck 92, typically a leading edge, point or portion of the side surface 102. Each of the side surfaces 102 may include one or more surfaces that intersect at an edge or point.

A boss 104 having a generally cylindrical configuration is on the distal end 96 of the neck 92 and extends longitudinally in a direction extending between the respective opposing side surfaces 102. The boss 104 includes first and second ends 106, 108 with an aperture 110 extending longitudinally through the boss 104 between the first and second ends 106, 108. Although shown with a circular cross-section, the aperture 110 may have other cross-sectional shapes such as square, hexagonal, star or eccentric provided the cutting tool has a similar cross-sectional shape. The boss 104 is a generally annular member having an inner surface defined by the aperture 110 and an outer surface 112. The outer surface 112 of the boss 104 may have various configurations and may have a width or thickness greater than the width or thickness of the neck 92, with the thickness of the neck 92 defined as the distance between the inner surface 98 and outer surface 100. A pair of shoulders 114 are on the neck 92 adjacent the first and second ends 106, 108 of the boss 104. The first and second ends 106, 108 have a generally planar or flat surface 116 with a chamfered portion 118 extending between the flat surface 116 and the aperture 110. The chamfered portions 118 may be at both ends of the aperture 110.

A cutting tool or tooth 120 including a head portion 122 and a shank portion 124 may be attached to the outer tool holder 70. The head portion 122 has a parallelepiped shape formed by a front or leading surface 126 and a rear or trailing surface 128 interconnected by opposite side surfaces 130. A cutting tip 132, typically a hardened insert formed of a material such as tungsten carbide, may be secured to the head portion 122 by brazing; typically, the cutting tip 132 is braced to the front or leading surface 126 of the head portion 122. Any suitable tough material capable of withstanding abrasion and impact can be substituted for the tungsten carbide and affixed by any method used for the given material such as adhesive, solder or welding.

The shank portion 124 is shown in the preferred embodiment with a cylindrically shaped shaft 134. A plurality of threads 136 are formed on the end 138 of the cylindrically shaped shaft 134 opposite the head portion 122. The cutting tooth 120 is held in place on the outer tool holder 70 by a nut 140 engaging the threads 136 on the cylindrically shaped shaft 134. Given that the aperture 110 in the boss 104 may include chamfered portions 118 at ends, a correspondingly beveled spacer 148, see FIG. 1, is located between the nut 140 and the boss 104. The spacer 148 includes a beveled portion 148a complementary to the chamfered portion 118 on the boss 104 and a flat end 148b opposite the beveled portion 148a. The flat end 148b suitably sized for engaging the nut 140. The spacer 148 further includes an aperture 148c extending therethrough sized to receive the shank portion 124 of the cutting tool 120. The spacer 148 helps to align and secure the cutting tool 120 in the aperture 110 in the boss 104.

A plurality of planar indentations 142 are located about the outer circumferential surface of the head portion 122. The planar indentations 142 are spaced from one another a predetermined amount, illustrated as 120°. The planar indentations 142 on the head portion 122 matingly engage the planar or flat surface of the shoulder 114 on the neck 92 and cooperate with the shoulder 114 to resist rotation of a cutting tool 120 about its longitudinal axis 146. The multiple planar indentations 142 on the head portion 122 of the cutting tooth 120 help make the cutting tooth 120 indexable.

The planar indentations 142 of the head portion 122 of the cutting tooth 120 cooperate with the shoulder 114 of the tool portion 90 to prevent rotation of the cutting tool 120 during the cutting or stump grinding operation. Positioning the planar indentations 142 adjacent the shoulder 114 keeps the cutting tool 120 from rotating when tightening or loosening the nut 140.

Although the shank portion 124 is shown with a cylindrical shape, it may take or have other cross-sectional shapes as long as such shapes correspond to the aperture 110 in the boss 104. Various other cross-sections such as hexagonal, square or any other shape or variety are suitable. These cross-sectional shapes are, however, suitable alternative designs for the present invention and are therefore encompassed by the present invention. While a nut 140 threaded onto the threads 136 of the shank portion 124 holds or retains the cutting tool 120 to the outer tool holder 70 other mechanisms may secure the cutting tooth 120 tool holder 70. A spring type external or internal lock ring on the shank portion 124 or aperture 110 cooperating a corresponding groove; a cross pin extending through the boss 104 and cutting tool 120; and a threaded fastener inserted into corresponding internal threads in an end 138 of the shank portion 124.

As illustrated in FIG. 9a the boss 104 of the outer tool holder 70 tool holder may be offset from the plane 150 of the base portion 72. Angles θ from 0° to 45° are typically employed. However, the offset angle θ may be up to and greater than 90° depending upon the configuration desired.

Turning to FIG. 10a, an outer tool holder 70 is shown having a symmetrical shape such that the outer tool holder 70 may be used on both side surfaces 38, 40 of the wheel 10. The cutting tool holder 70 is symmetric on each side of the centerline 161. The centerline 161 bisects the outer tool holder 70 along a radial. The outer tool holder 70 is reversible; that is, the boss 104 of the outer tool holder 70 is a mirror image about a plane passing through the respective point 168. The point 168 is an equal distance from each of the center points 162, 164 of the mounting apertures 80, 82 on a line 166 extending through the center points 162, 164 of the mounting apertures 80, 82 when the plane is located perpendicular to the line 166.

Since the outer tool holder 70 may be rotated 180° and placed on the opposite side of the wheel 12, the counter bored 86 aperture 82 will line up with the threads 88 of the corresponding aperture 80. A threaded fastener extending through the counter bored 86 aperture 82 is received in the threads 88 of the aperture 80 in the outer tool holder 70 positioned on the opposite side surface of 40 of the wheel 10. With this configuration the outer tool holder 70 may be mounted on either side surface 38, 40 of the cutting wheel 10.

FIGS. 13-15 illustrate an inner tool holder 152 manufactured in a straight version; that is, one wherein the boss 154 of the inner tool holder 152 is in line, or at a 0° angle with a plane 156 extending through the base portion 158 of the inner tool holder 152. Rather than being angled, the neck 160 of the inner tool holder 152 may extend at an orientation lying in the same plane 156 as the base portion 154.

Wherein the location of the respective outer tool holder 70 and inner tool holder 152 on the wheel 10 may determine the orientation of the boss 104, 154, both the outer tool holder 70 and inner tool holder 152 disclosed may have different orientations than illustrated. Turning to the inner tool holder 152, it has substantially the same configuration as the outer tool holder 70 in that it includes a base portion 158 having an inner surface 170 and an outer surface 172. The base portion 158 includes a pair of apertures 174, 176 extending from the outer surface 172 to the inner surface 170 of the inner tool holder 152. In the present example, the apertures 174, 176 are smooth bores 178 wherein the threaded fastener 52 extends through the respective apertures 174, 176.

As with the outer tool holder 70, the inner tool holder 152 further includes a neck portion 160 having a boss 154 containing an aperture 180 suitably sized for receiving a cutting tooth 120. Again, the inner tool holder 152, like the outer tool holder 70 is symmetrical about a centerline 182 and may be rotated 180° so it can be placed on either of the side surfaces 38, 40 of the wheel 10. While shown with a 0° angle or offset between the base portion 158 and the neck 160 and boss 154 of the boss 154 of the inner tool holder 152 may be offset at a preselected angle.

Turning again to FIGS. 1-6 there is shown the cutting assembly 12 on the cutting wheel 10. As illustrated, the tool holder 14, or outer tool holder 70, is placed adjacent the tool holder 16, or inner tool holder 152, with the inner surface 170 placed adjacent the side surface 38 of the wheel 10. A tool holder 20, for example outer tool holder 70 turned 180°, is placed adjacent the tool holder 18, or inner tool holder 150 with the inner surface 170 placed adjacent the side surface 40 of the wheel 10. The threaded fasteners 52 are used to secure the respective tool holders 14, 16, 18, and 20 to the wheel 10. The threaded fasteners 52 are inserted from opposite sides of the wheel 10 and extend through the apertures in the tool holders 14, 16, 18, 20, and the apertures 48, 50 in the wheel 10. Since the threaded fasteners 52 are received in corresponding threads 88 in the respective outer tool holders 70, tightening the fasteners 52 secures the cutting assembly 12 to the wheel 10. Typically the outer 70 and inner 152 tool holders are attached to opposite sides of the wheel 10 in identical pairs, that is the same configuration of outer 70 and inner 152 tool holders is used on both sides of the wheel time, see FIG. 5. However, the same tool holder configuration need not be used with each pair, nor do they need to be the same on the entire cutting wheel 10. Rather than being angled, the tool portion 90 may extend at other orientations regarding the base portion 72 including lying in the same plane as the base portion 72. For example, the tool portion 160 of the inner tool holder 152 may extend at an angle inwardly wherein the boss 154 is disposed over or above the arcuate outer surface 42 of the wheel 10. Further, the tool portion 90 of the outer tool holder 70 may extend outwardly at a 0° angle, such that it is in the same plane as the base portion 72 of the outer tool holder 70. The configuration and, correspondingly the orientation, of the respective tool portions 90, 160 of the outer tool holder 70 and inner tool holder 152 and the location of the respective bosses 104, 154 can be varied or positioned to achieve a desired profile.

During a stump cutting or grinding operation the stump cutting apparatus typically moves or swings the cutting wheel back and forth in a side to side motion. Initially, the apparatus swings or moves the cutting wheel either to the right or to the left to cut or grind away a portion of the stump 188, see FIG. 5a. Upon completing the first swing or pass, the cutting wheel moves forward towards the stump, after which the wheel is swings in the opposite direction. FIG. 5a illustrates, looking up from the ground with the cutting tools 22-28 coming out of the page, one example of the cut path or profile of the stump cutting apparatus 10 according to the present invention. As the apparatus 10 moves to the right, in the direction shown by arrow 190, the cutting tooth 22 in the tool holder 14 generates, as shown in the schematically illustrated stump 188, a cut profile 192 while the cutting tooth 24 in the tool holder 16 generates a cut profile 194. Once the cut path is completed in a direction 190, the cutting wheel 10 moves forward, towards the stump, and the cutting wheel 10 then moves or swings to the left that is in the direction of the arrow 198. When moving to the left, the cutting tooth 28 in tool holder 20 engages the stump 188 first and the cut path or profile is the same only in the opposite direction. That is the cutting tooth 28 in the tool holder 20 will cut first, after which the cutting tooth 26 in the tool holder 18 will cut the stump next.

FIGS. 16-21 illustrate an alternative embodiment of the present invention including a stump cutting apparatus 8 having cutting assembly 12 secured to a wheel 10. The cutting assembly 12 includes a tool holder, seen generally at 200, supporting a plurality of cutting tools 202. Similar to the previous embodiment, the tool holder includes a base portion 204 having an outer surface and an inner surface, 206, 208 wherein the inner surface is the surface closest or adjacent to the side surface 38, 40 of the wheel 10. A side surface 260 inner connects the outer and inner surface 206, 208 of the base portion 204. As with the previous embodiment, the side surface may have a multitude of configurations and the respective outer and inner surfaces 206, 208 may have different sizes or areas. The base portion 204 includes a pair of apertures 210, 212 extending therethrough between the respective inner and outer surface 206, 208 wherein the apertures received fasteners 214 used to secure the tool holder 200 to the wheel 10.

Figure 16:
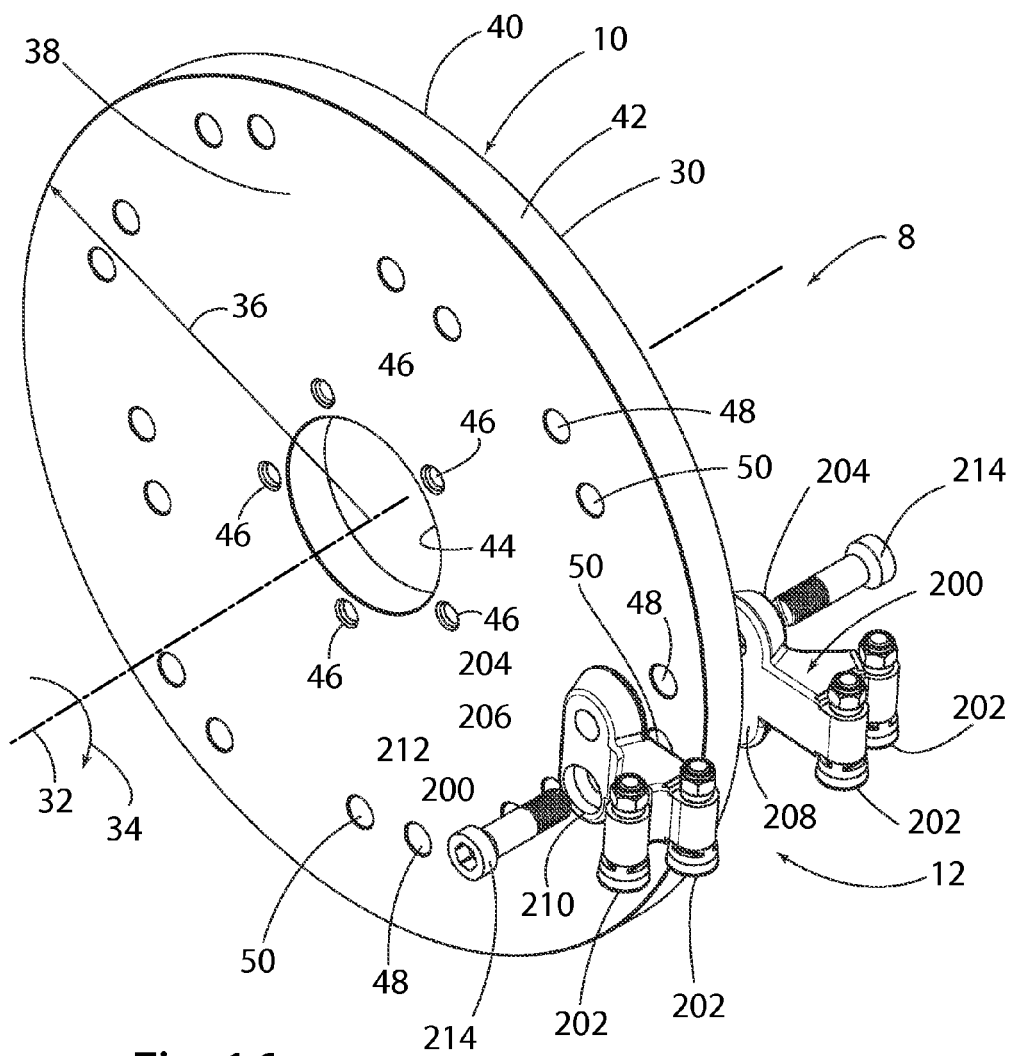
FIG. 16 is a perspective view of a cutting wheel assembly having multiple tool holders according to an additional embodiment of the present invention.
Figure 19:
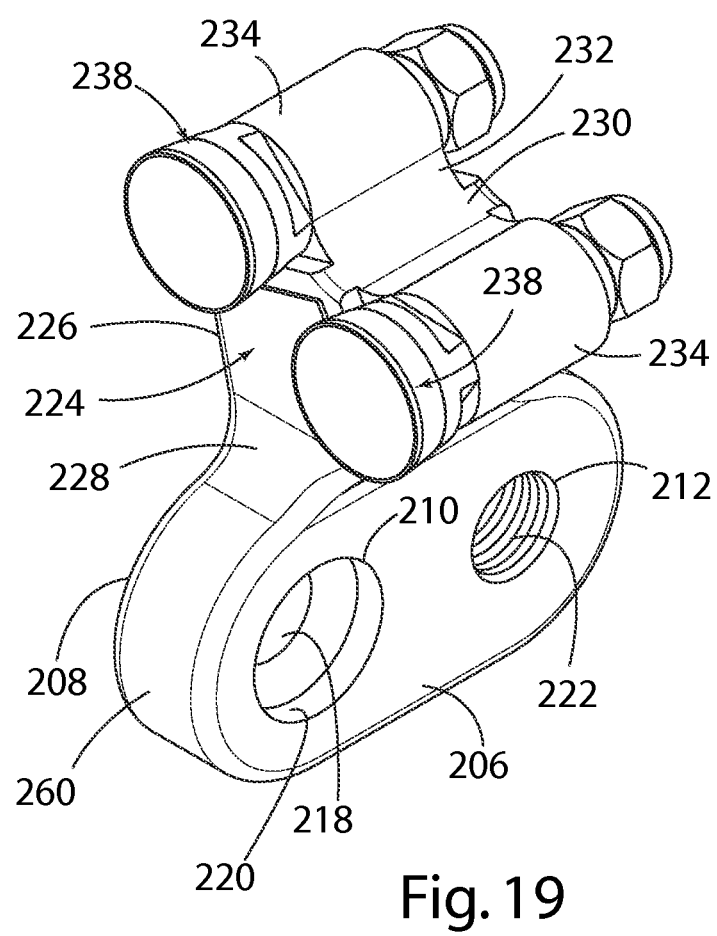
FIG. 19 is a perspective view of the tool holder of FIG. 17.

FIG. 16 illustrates the respective tool holders 200 and cutting tools 202 secured or mounted to a cutting wheel 10 using threaded fasteners 214. As with the previous embodiment, the threaded fasteners extend through countersunk or counter bored portions 220 and smooth bores 218 of the respective tool holders 200, through the apertures 48, 50 and are threadably received in the threaded portions 222 of the opposite aperture. As set forth previously tightening the threaded fasteners 214 operates to sandwich the wheel between the respective tool holders 200 and secure the respective tool holders 200 and cutting tools 202 to the wheel 10.

As previously disclosed, the tool holders 200 are secured to the wheel 10 in pairs with respective tool holders being mounted opposite to one another on respective side surfaces 38, 40 of the wheel 10. While not required, similar to the tool holders 70, 152 of the previous embodiment, the tool holder 200 can be symmetrical about a centerline 216, see FIG. 18, such that they can be rotated 180° and placed on the opposite side of the wheel 10. The exception being that aperture 210 includes a smooth bore 218 and countersunk portion 220 and the adjacent aperture 212 includes a threaded portion 222. The countersunk portion 220 may be a flat surface substantially parallel to the inner surface 208 of the tool holder 200 or it may be a beveled surface; that is extending at an angle to the inner surface 208 of the tool holder 200. A single tool holder 200 may be used on both sides 38, 40 of the wheel 10 by rotating it 180° wherein fasteners 214 extending or inserted from both sides 38, 40 of the wheel 10 operate to secure the tool holders 200 to the wheel 10 as illustrated in FIG. 16.

Each tool holder 200 includes a tool portion 224 including a neck or support portion 226 having a proximate end 228 and a distal end 230. The proximate end 228 attached to the base portion 204 with the distal end of the support portion 226 having a plurality of arms 232 each having a boss 234 on an end. Each boss 234 including an aperture 236 suitably sized to support a cutting tool 202. Each tool holder 200 supports more than one cutting tool 202.

The tool holder 200 may be formed as a one-piece body with the base portion 204 and tool portion 224, including the support portion 226 and arms 232, formed as an integral unit. As set forth previously, each boss 234 is configured with an aperture 236 suitable for receiving a cutting tool 202. Again the cutting tool 202 used with this embodiment is similar to that disclosed previously.

Figure 20:
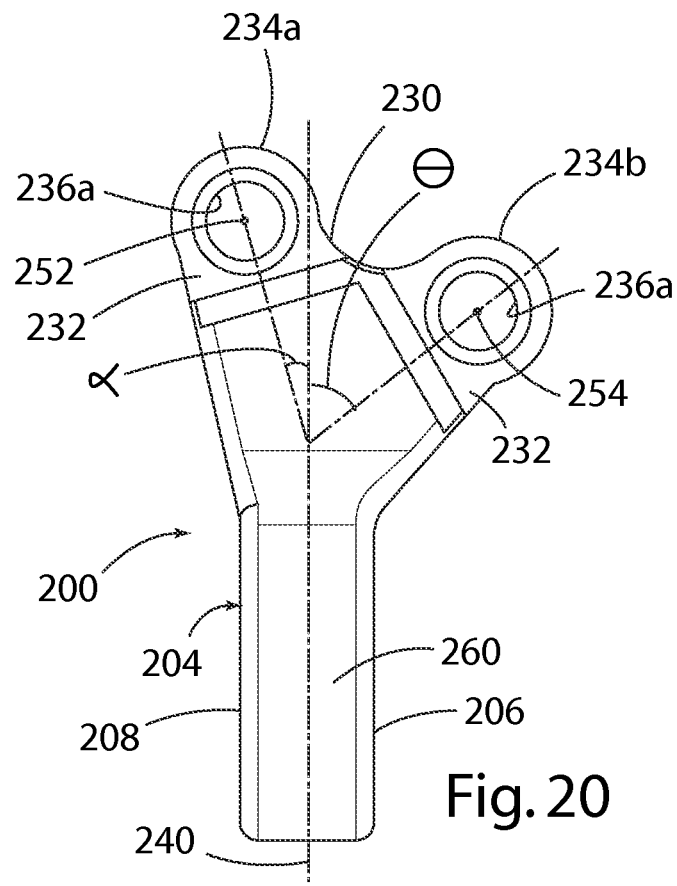
FIG. 20 is a front view of the tool holder of FIG. 17 illustrating an offset angle.
Figure 21:
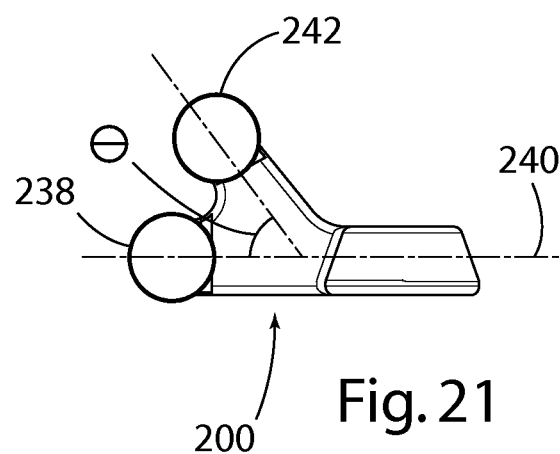
FIG. 21 is a front view of an alternative embodiment of the tool holder of FIG. 17 illustrating multiple an offset angles.
Figure 22:
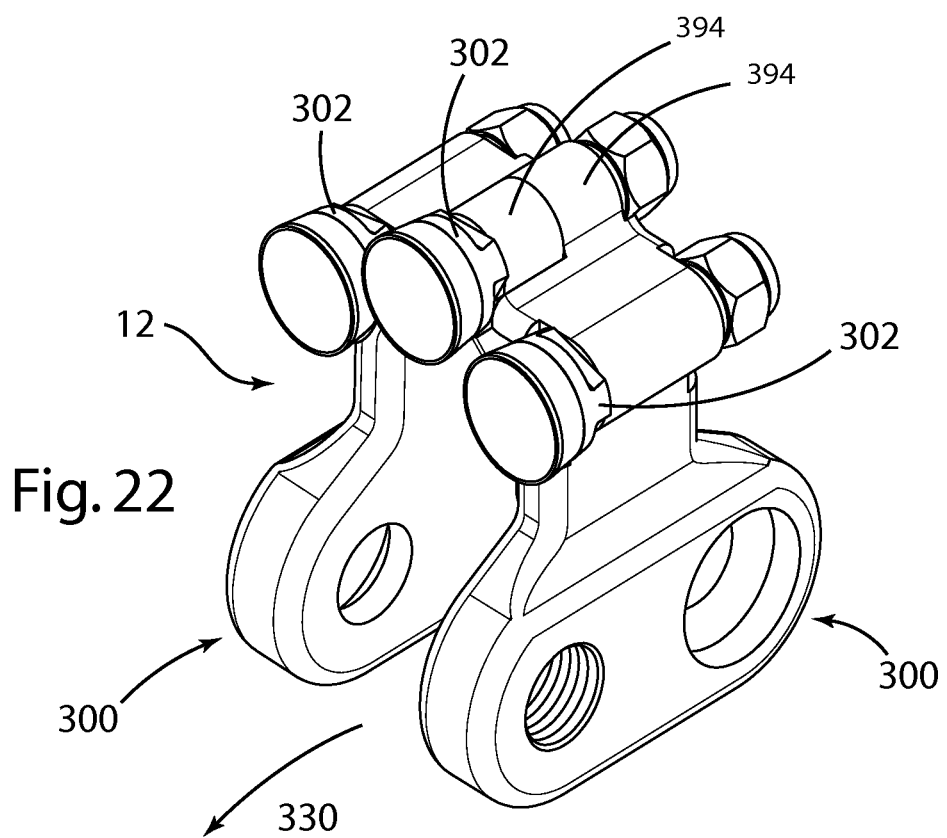
FIG. 22 is a perspective view of a cutting tool assembly for use with a cutting wheel according to a further embodiment of the present invention.

Similar to the previous embodiment, the position of the cutting tool 238, that is its location regarding the peripheral edge 30 and arcuate outer surface 42 of the cutting wheel 10 along with the side surface 38, 40 of the cutting wheel 10 varies depending upon the location chosen. FIG. 20 illustrates one example wherein a first cutting tool 238 is located or positioned at approximately a 0° angle regarding a line 240 extending through the tool holder 200 at a midpoint between the outer and inner surfaces 206, 208 and parallel to the outer surface 208 of the tool holder 200. A second cutting tool 242 is offset at an angle theta (θ) from the line 240. The position of the cutting tools 238, 242 positioned according to the varying parameters including machine horsepower, chip flow path, depth of cut, tooth type, and wheel size. While the tool holder 200 shown has only two bosses 234 and correspondingly supports only two cutting tools 202, the present invention contemplates adding multiple bosses and correspondingly cutting tools to a single tool holder 200.

FIGS. 17-20 illustrates another example of a tool holder 200 according to the present invention wherein the cutting tool 244 is mounted left of the line 240 whereby it is located closer to one of the side surfaces 38, 40 of the wheel 10 and the second cutting tool 246 is located outwardly from the first cutting tool 244. As illustrated in FIG. 30, the centerline 252 of the aperture 236a in the boss 234a is at an angle of alpha (α) regarding the line 240 while the centerline 254 of the aperture 236b of the second boss 234b is at an angle of theta (θ) regarding the line 240. The first cutting tool 244 is at an angle alpha (α) and the second cutting tool 246 is at an angle of theta (θ) with respect to line 240. It should be understood that the respective centerlines or longitudinal axes of the cutting tools 244, 246 can be placed at various distances or lengths along their respective angular positions.

FIGS. 22-37 illustrate another embodiment of a cutting assembly, seen generally at 12 according to another aspect of the present invention. The cutting assembly 12 includes a tool holder 300 and a cutting tool 302. As illustrated, two tool holders 300 cooperate to support three cutting tools 302. As with the previous embodiments, the tool holder 300 includes a base portion 304 having an outer surface 306 and an inner surface 308. A side surface 309 connects the respective outer and inner surfaces 306, 308. While the respective outer and inner surfaces 306, 308 are generally planar and extend parallel to the respective side surfaces 38, 40 of the wheel 10 the side surface 309 of the base 304 of the tool holder 300 may have a multitude of configurations including arcuate, beveled, curved, parabolic or other shapes as illustrated in the examples of the previous embodiments.

A pair of apertures 310, 312 extend through the base portion 304 between the outer surface and inner surface 306, 308. As with previous embodiments, one aperture 310 includes a smooth bore 314 and countersunk or counter bored portion 316 while the other aperture 312 includes a plurality of threads 318.

As with the previous examples, and shown in FIG. 32, the tool holders 300 may be symmetrical about a line 320 at a midpoint 322 between the centerlines 324, 326 of the respective apertures 310, 312. Wherein the midpoint 322 is on a line 328 passing through the respective center lines 324, 326 of the apertures 310, 312 and the line 320 is perpendicular to the line 328. The tool holder 300 may be symmetrical about a plane parallel to the centerlines 324, 326 of the first and second apertures 310, 312 in said base portion 304 when said plane is at the midpoint of and perpendicular to a plane passing through the respective center lines 324, 326 of said first and second apertures 310, 312. With, one exception, the aperture 310 has a smooth bore 314 and countersunk or counter bored portion 316 and the aperture 312 has a threaded portion or plurality of threads 318.

Figure 25:
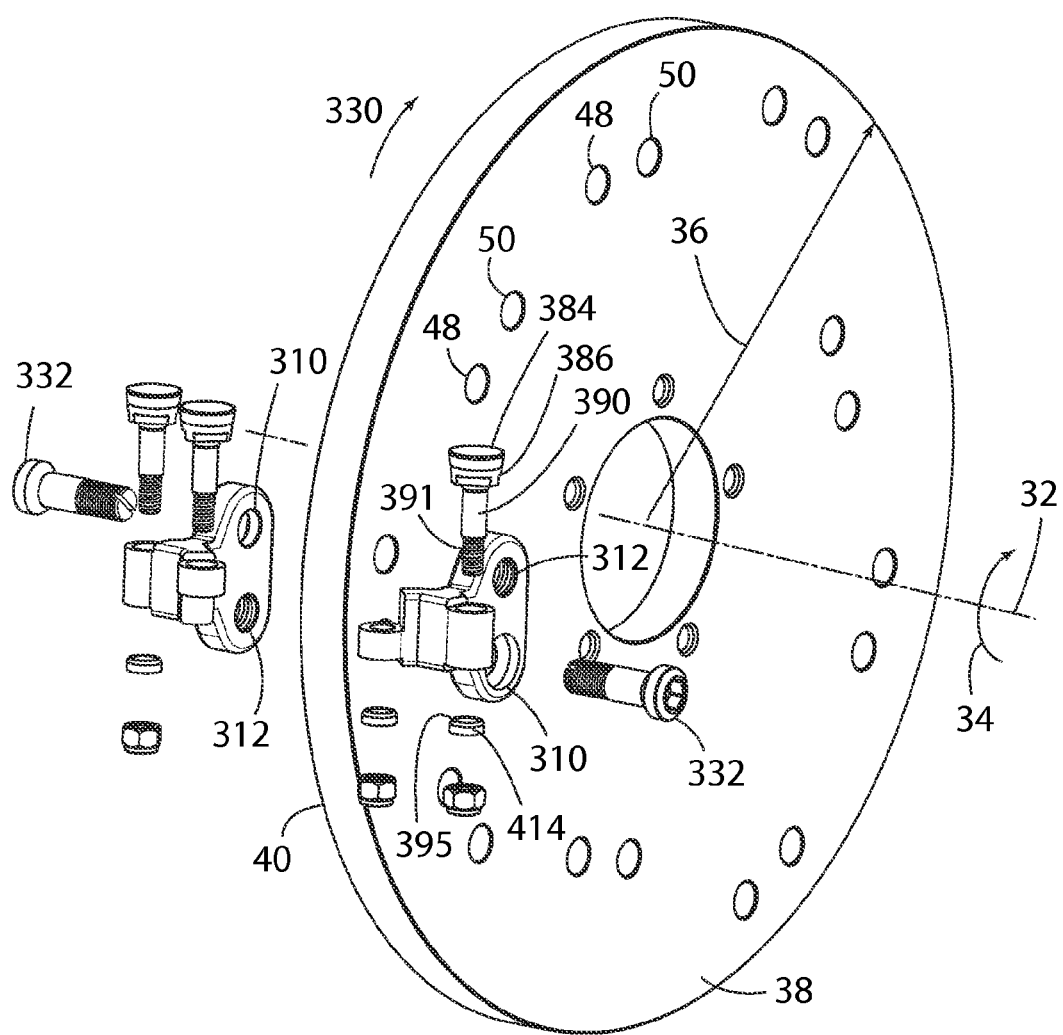
FIG. 25 is an exploded perspective view of the cutting tool assembly of FIG. 22 shown with a cutting wheel.

Similar to the previous examples, the same tool holder 300 may be used on both sides of the cutting wheel 10. As illustrated in FIG. 25 to use the same tool holder 300 on both side surfaces 38, 40 of the wheel 10 one of the tool holders 300 is rotated 180°. As shown, the tool holders 300 on the respective side surfaces 38, 40 of the wheel 10 are orientated such that the second aperture 312 having the threads 318 is placed on one side surface 38 of the wheel 10 with that second aperture 312 located ahead of the first aperture 310 in the direction of the cutting wheel 10 as indicated by the arrow 330. The second tool holder 300 or tool holder on the other side surface 40 of the wheel 10 is rotated 180°. It is turned such that the first aperture 310 having the countersunk portion 316 is placed on the opposite side 40 of the cutting wheel 10 wherein the first aperture 310 is located ahead of the second aperture 312 in the direction of the cutting wheel as indicated by the arrow 330. A fastener 332 extending through the first aperture 310 of the tool holder 300 on the opposite or far side of the wheel 40 is threadably received in the second aperture 312 of the corresponding, opposite tool holder 300 on the near side of the wheel 38. Further, the first aperture 310 of the tool holder 300 on the near side 38 of the cutting wheel 10, located behind the second aperture 312 in the direction of rotation of the cutting wheel illustrated in FIG. 25 by the arrow 330, is aligned with the second aperture 312 of the tool holder 300 on the opposite or far side 40 of the cutting wheel 10. The fastener 332 extending through the first aperture 310 is threadably received in the second aperture 312 of the adjacent tool holder 10.

The side surface 309 of the tool holder 300 forms the leading surface or front portion of the tool holder 300. The leading surface or front portion of the tool holder 300 is the surface or portion on the same side of the tool holder 300 as the cutting tip of the cutting tool 302 or first in the rotational direction of the wheel 10 illustrated by the arrow 330. Since the tool holder 300 can be rotated 180° and placed on either side of the wheel 10 either side surface 309 of the base portion 304 can be the leading surface or front portion.

As illustrated in FIGS. 26-30 the tool holder 300 includes multiple tool portions, including a first tool portion 336 and a second tool portion 338. In the disclosed example, the first tool portion 336 extends generally outwardly from the plane of the outer surface 306 and the second tool portion 338 extends generally inwardly from the plane of the inner surface 308. The first tool portion 336 includes a neck or support member 340 having a proximal end 342 connected to the base portion 304 and a distal end 344. The neck or support member 340 has an inner surface 352 and an outer surface 354 connected by opposing side surfaces 356. The second tool portion 338 includes a neck or support member 346 having a proximal end 348 connected to the base 304 and a distal end 350. The neck or support member 346 has an inner surface 358 and an outer 360 surface connected by opposing side surfaces 362. As with the previous examples, the opposing side surfaces 356, 362 of the first and second tool portions 336, 338 may have multiple configurations including an arcuate or parabolic surface further, the opposing side surfaces 356, 362 may have a curvature or swept configuration that minimizes chip broadcasting as set forth previously. In such instances, the neck or support members 340, 346 may have an elliptical or otherwise narrowing cross-section where the leading side surface has a configuration designed to travel through the chips and include a slope, taper, curve or radius starting at the midpoint or center of the side surface and extending back to both the inner and outer surfaces. It may also be flat or planar or slope from a leading point, edge or surface on the respective neck or support member 340, 346. See for example the configurations in FIGS. 11a-11e, which all disclosed as configurations for the side surface of a mounting base are also suitable as configurations for the neck portion 340, 346 of the tool holder 300.

The inner and outer surfaces 352, 354, 358, 360 of the respective neck or support members 340, 346 of the first and second tool portions 336, 338 can have different sizes wherein the size of the area of the outer surfaces 354, 360 may be less than the area of the inner surfaces 352, 358. For example, if the area of the outer surface 354 of the neck or support member 340 is less than the area of the inner surface 352 than a cross section of the neck or support member 340 taken along a plane transverse the longitudinal axis of the neck or support member 340 would have a trapezoidal shape.

Similar to the previous examples, a boss 364 having a generally cylindrical configuration is on the distal end 344 of the neck or support member 340 of the first tool portion 336. The boss extends longitudinally in a direction extending between the respective opposing side surfaces 356, 362. As with the previous embodiments, the boss 364 on the first tool portion 336 includes first and second ends 368, 370 with an aperture 372 extending between the first and second ends 368, 370. Although shown with a circular cross-section, the aperture 372 may have other cross-sectional shapes such as square, hexagonal, star or eccentric provided the cutting tool has a similar cross-sectional shape. As illustrated, the boss 364 is a generally annular member having an inner surface 374 defined by the aperture 372 and an outer surface 376. The outer surface 376 of the boss 364 may have various configurations and may have a width or thickness greater than the width or thickness of the neck or support member 340 of the first tool portion 336, with the thickness of the neck or support member 340 defined as the distance between the inner surface 352 and the outer surface 354. A pair of shoulders 378 are on the neck or support member 340 adjacent the first and second ends 368, 370 of the boss 364. The first and second ends 368, 370 have a generally planar or flat surface 380 with a chamfered portion 382 extending between the flat surface 380 and the aperture 372. The chamfered portions 382 may be located at both ends of the aperture 372.

A cutting tooth 384 including a head portion 386 and a shank portion 390 may be attached to the first tool portion 336. The cutting tooth 384 further includes a plurality of threads 391 on one end of the shank portion 390. A nut 416 engaging the threads 391 is used to secure the cutting tooth 384 to the tool holder 300. A retainer 414 having a beveled portion 395 slides over the shank 390 and helps to properly locate and secure the cutting tooth 384 in the aperture 372. The cutting tooth 384 similar in configuration to the cutting tooth 120 of the previous examples.

The boss 364 of the first tool portion 336 may be offset from the plane 392 of the base portion 304 at an angle (θ) of 90°. Angles from 0° to 90° are typically employed; however, the offset angle may be greater than 90° depending upon the configuration desired. The distance dl of the offset, or distance between the outer surface 306 of the base portion 304 and centerline 372a of the aperture 372 of the boss 364, may be varied depending upon various factors including as an example the size and horsepower of the machine, wheel size and thickness, cutting tooth size, machine clearance and cut profile.

The second tool portion 338 includes a boss 394 at the distal end 350 of the neck or support member 346. In the disclosed example the tool holder 300 is configured for use on both side surfaces 38, 40 of the wheel 10 to form the cutting assembly 12. The boss 394 includes a first end 396 and a second end 398. The first end 396 is located adjacent or closer to the side surface 362 of the second tool portion 338 and the second end 398 is located between the respective side surfaces 362 of the second tool portion 338 and in the present example at the midpoint or line 320. The first end 396 is leading end or forward and in direction of wheel 10 rotation or travel illustrated by the arrow 330. Further, the first end 396 as set forth more fully herein is the end that receives and supports the head portion 386 of the cutting tool 384.

In the disclosed example, the size or overall length second boss 394 on the second tool portion 338 is approximately half of the size or overall length of the first boss 364 located on the first tool portion 336. As illustrated in FIGS. 35-36 a ledge or shelf 400 forms a portion of the distal end 350 of the second tool portion 338. The ledge or shelf 400 is located below the aperture 404, extending between the first end 396 and second in 398 of the boss 394 and provides clearance for the boss 394 of a tool holder 300 placed opposite of or on the opposite side of the wheel 10 when the two tool holders 300 are connected to the wheel 10.

As illustrated in FIGS. 35-36 when the tool holders 300 are combined and secured opposite one another on the wheel 10, the respective bosses 394 of each of the tool holders 300 are positioned adjacent the corresponding ledge or shelf 400 of the opposite tool holder 300. As shown, the outer surface 422 of the boss 394 is spaced from the ledge 400. As illustrated in the second ends 398 of the respective bosses 394 are positioned adjacent one another given that the respective second ends 398 of the bosses 394 are flat surfaces 410. The first end 396 of the boss 394 includes a flat surface 406 and a chamfered portion 408. The flat surface 406 and chamfered portion 408 are configured to receive the head portion 386 of the cutting tooth 384. The first end 396 of the boss 394 further includes a shoulder 410 suitable for engaging the head portion 386 of the cutting tooth 384 as set forth in the previous examples.

Figure 33:
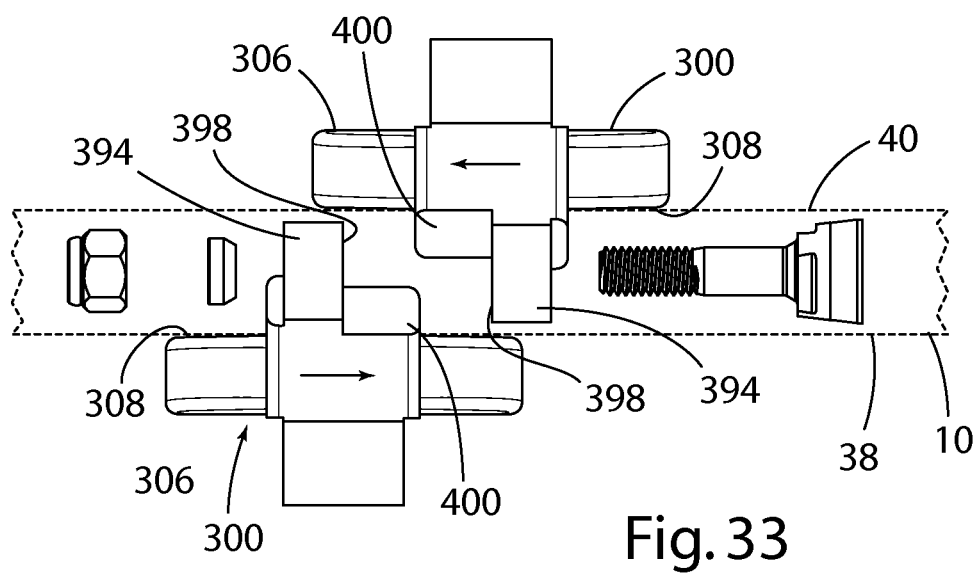
FIG. 33 is a top view of the tool holder and a cutting tooth of the cutting tool assembly of FIG. 22.
Figure 34:
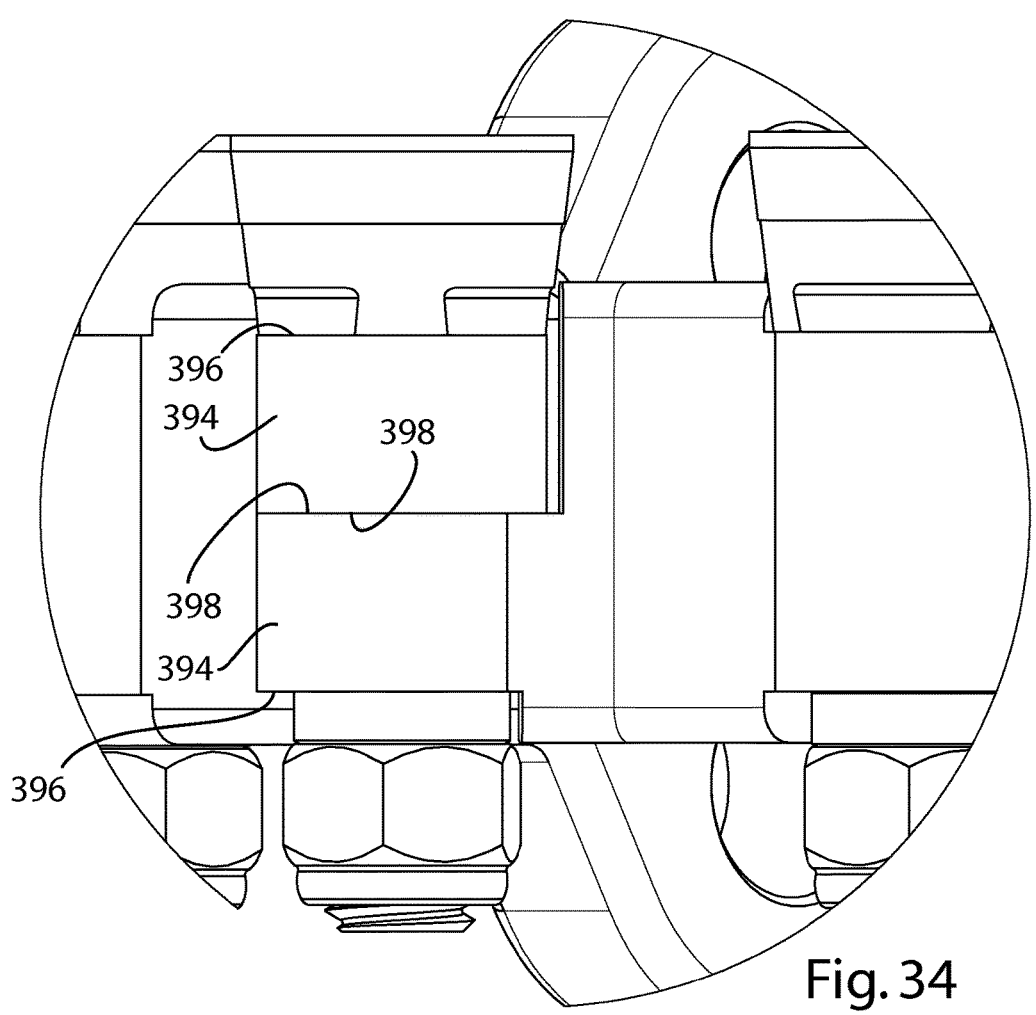
FIG. 34 is an enlarged view of the top portion of the cutting tool assembly of FIG. 22.

FIG. 33 shows two tool holders 300 with a cutting tooth 384, retainer 414 and nut 416 in a perspective view prior to assembly. The tool holders 300 are identical, with one of the tool holders 300 rotated 180° and placed opposite the other tool holder 300. When placed in the assembled position, the respective second ends 398 of the tool holders 300 are placed adjacent one another. The respective ledge or shelf 400 of each tool holder 300 provides clearance for the opposite boss 394. That is, the ledge or shelf 400 of the left side of the tool holder 300 on the left side or side surface 40 of the wheel 10 provides clearance for the boss 394 of the tool holder 300 on the right side or side surface 38 of the wheel 10. In this manner, the respective apertures 310, 312 of the corresponding tool holders 300 on the left side and right side, or side surfaces 40, 38, of the wheel 10 are properly aligned whereby fasteners 52 are used to secure the two tool holders 300 to the cutting wheel 10. Shelf 400 provides clearance for the boss 394 of the corresponding tool holder 300 enables proper alignment of the respective centerlines of the apertures 404 of adjacent bosses 394 and provides sufficient clearance for the head and cutting tip of the cutting tool 384.

The gap between the outer surface 442 of the boss 394 and the ledge or shelf 400 allows for manufacturing tolerances and assists in alignment of the respective centerlines 402 of the apertures 404.

Accordingly the cutting assembly 12 of the foregoing example provides three independent mounting locations for cutting tools 384 wherein the bosses 394 on corresponding tool holders 300 cooperate together to form a center mounting location for a cutting tool 384. In the illustrated example the center mounting location for the cutting tool 384 is located over and spaced from the peripheral edge 30 and arcuate outer surface 42 of the wheel 10. The two tool holders 300 cooperate together to support three cutting tools 384. Given that the tool holders 300 are symmetrical about the line or axis 320 only a single tool holder 300 is needed. However, the present example also contemplates using non-symmetrical tool holders wherein the two tool holders act or cooperate to support one or more additional cutting tools 384.

Figure 37:
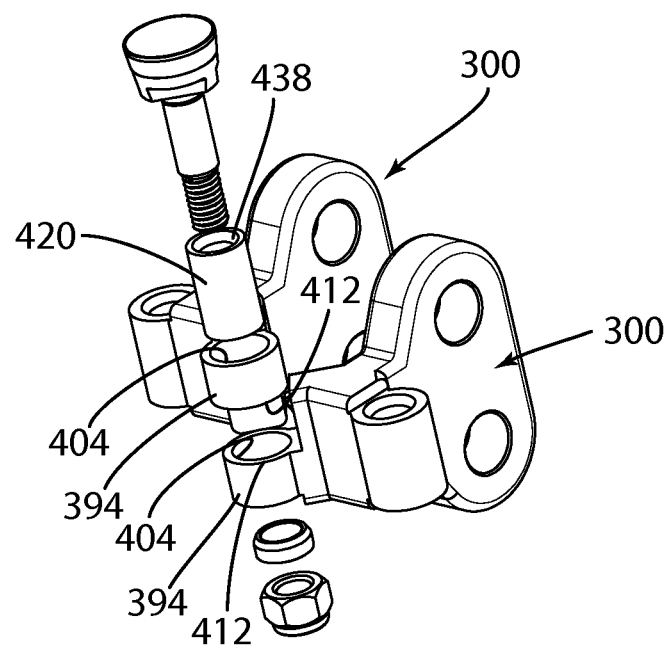
FIG. 37 is an exploded perspective view of an alternative embodiment of a cutting tool assembly similar to that of FIG. 22.
Figure 38:
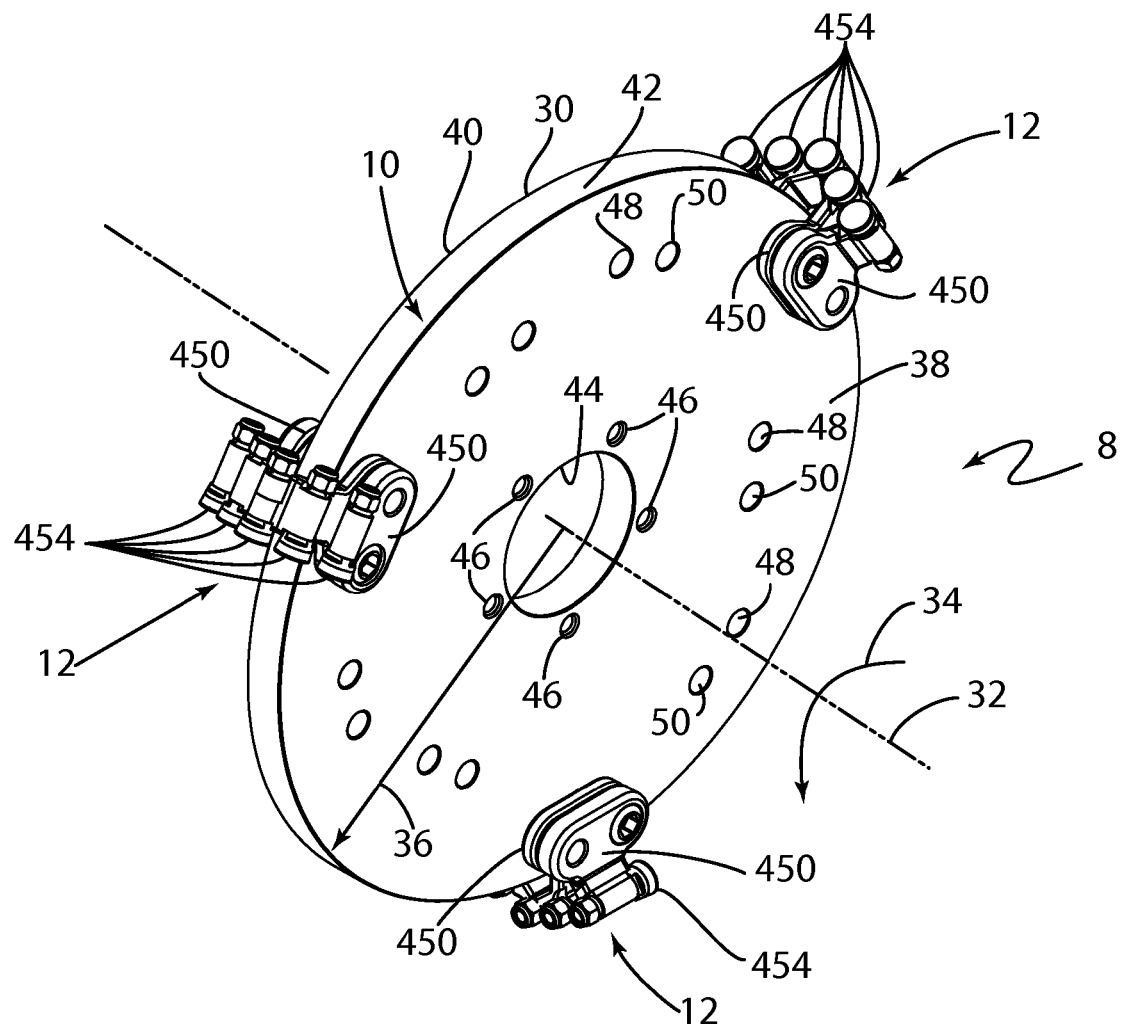
FIG. 38 is a perspective view of a further alternative embodiment of a cutting wheel assembly.
Figure 42:
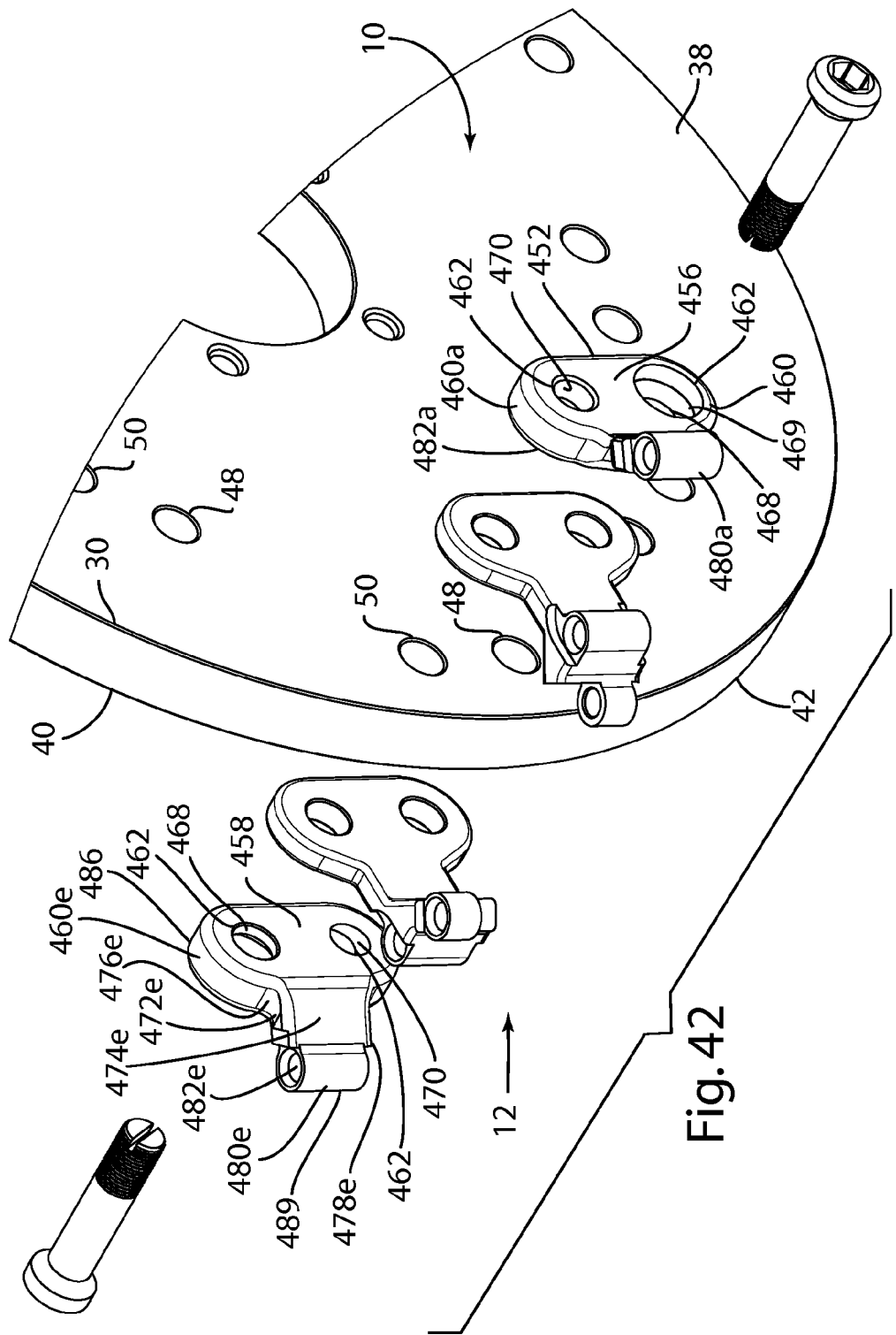
FIG. 42 is an exploded perspective view of the cutting wheel assembly of FIG. 38
Figure 44:
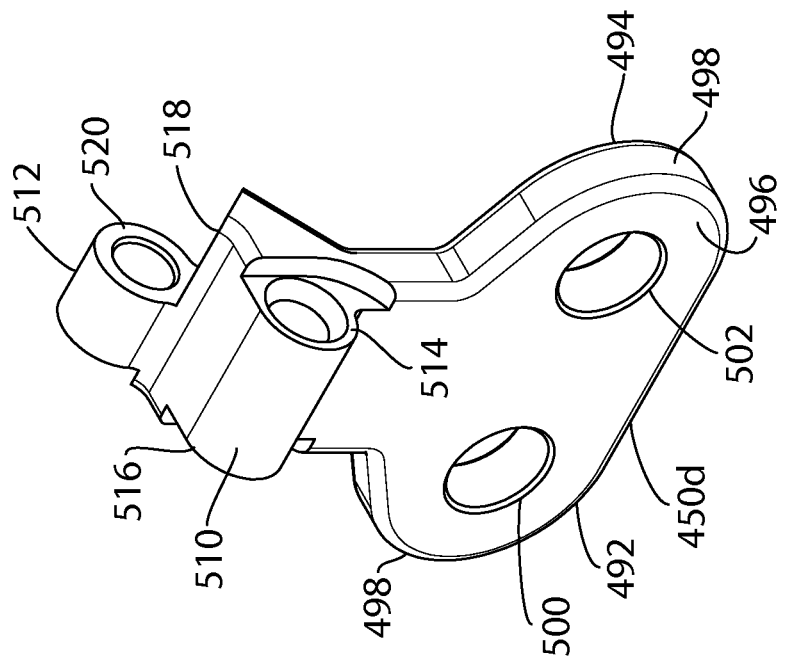
FIG. 44 is a perspective view of a tool holder of the cutting tool assembly of FIG. 38 rotated 90° from that shown in FIG. 43.
Figure 43:
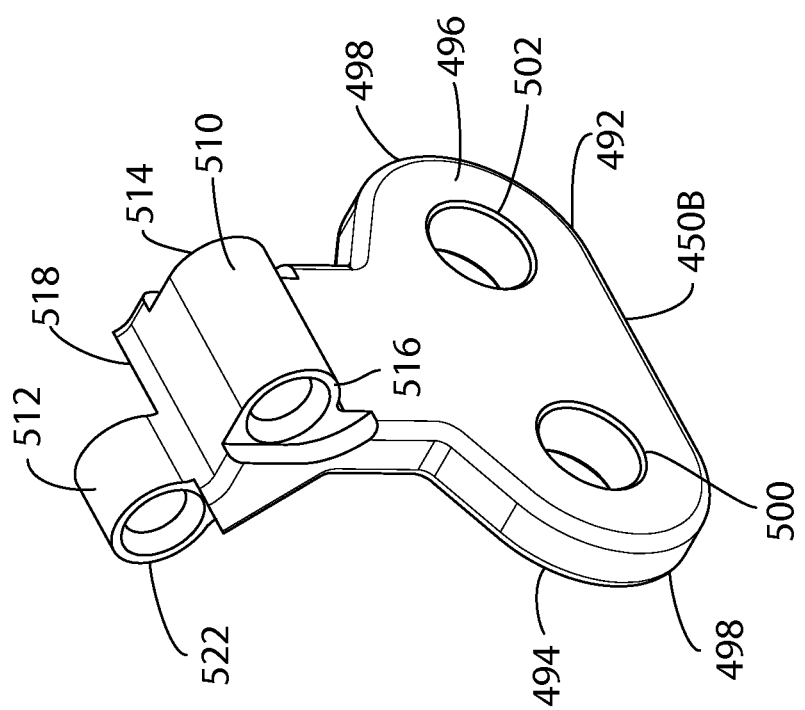
FIG. 43 is a perspective view of a tool holder of the cutting tool assembly of FIG. 38.

FIG. 37 illustrates another example of a cutting assembly 12 utilizing two tool holders 300 that cooperate together to support a cutting tool 384. As illustrated, the aperture 404 is slightly enlarged from the previous example and an elongated sleeve 420 is placed in the aperture 404 of both tool holders 300 on the center boss 394 whereby it extends across the interface between the respective flat surfaces 412 of the second ends 398 of the boss 394. The sleeve 420 operates to reduce wear or shear loads on the shank of the cutting tool 384 at the interface or intersection of the second ends 398 of the bosses 394. The sleeve 420 may also include a chamfered portion 438 configured to receive a beveled portion of the cutting tool 384 located between the head portion 386 and shank portion 390.

Another example of the present invention wherein the inner diameter of the aperture 404 of the boss 394 is larger than the outer diameter of the shank portion 390 of the cutting tool 384 and the sleeve is eliminates. The difference in diameters provides additional clearance to reduce any shear loading on the shank portion 390 of the cutting tool 384 during the cutting operation should the bosses 394 of the respective right and left tool holders 300 move laterally, that is in a direction transverse the longitudinal axis of the shank portion 390 of the cutting tool 384.

Figure 23:
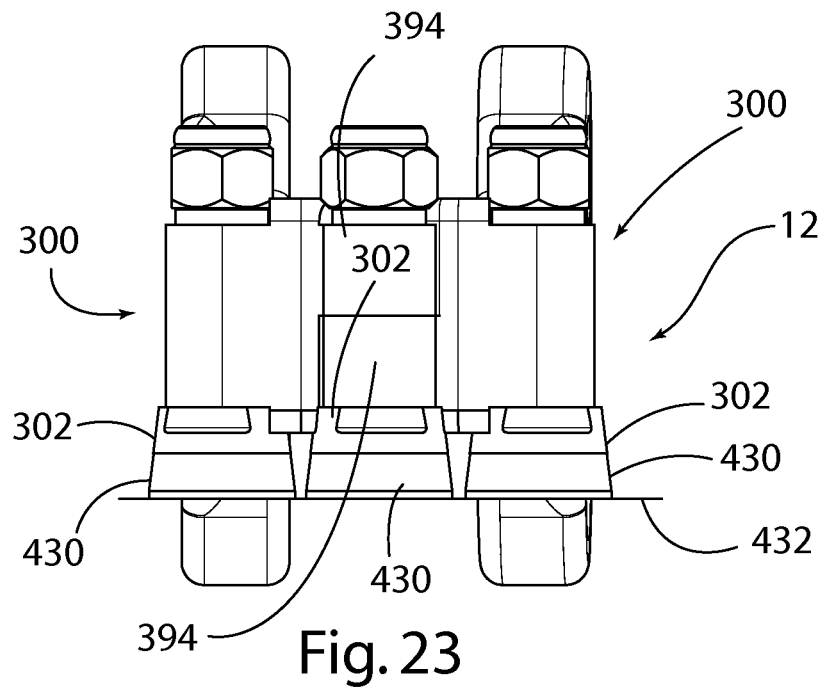
FIG. 23 is a top view of the cutting tool assembly of FIG. 22.
Figure 24:
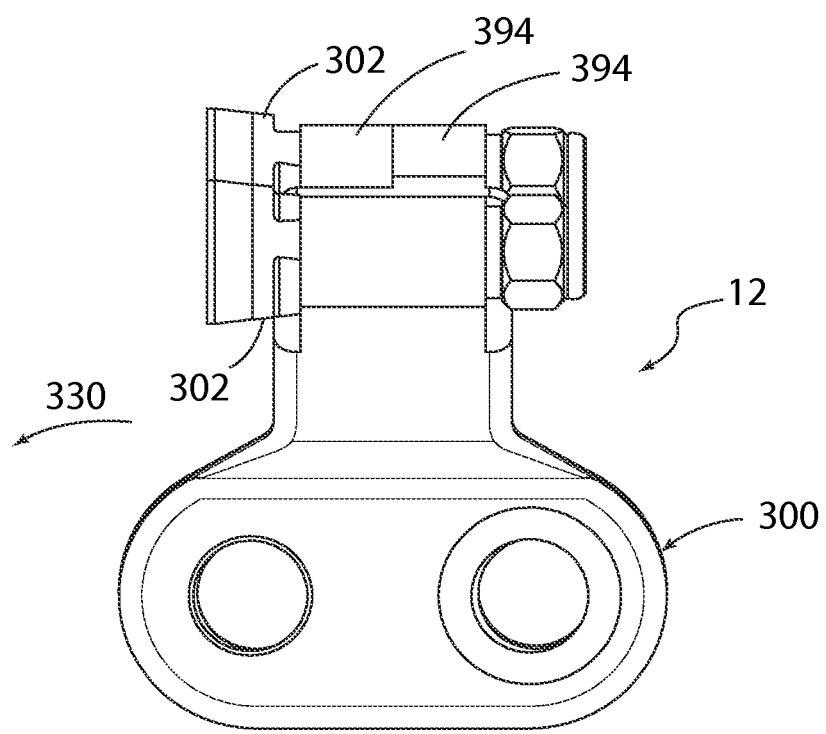
FIG. 24 is a side view of the cutting tool assembly of FIG. 22

As illustrated in FIG. 23 the cutting tips 430 of the respective cutting tools 384 in the bosses are all in the same plane 432. The plane 432 extends across the plane of the cutting wheel 10. In one embodiment, the plane 432 is parallel to the plane of the respective flat surfaces 380 at the first end 396 of the boss 368 of the tool holder 300. Wherein the shank portions 390 of the respective cutting tools 384 extending transverse to a radial 36 extending outwardly from the axis 32. In another embodiment, the plane 432 contains the axis 32. That is, since the flat surfaces 380 of the respective first ends 396 of the bosses 368 of each of the bosses 364a, 364b, 364c are all in a common plane then the respective cutting tips 430 are also in or contact a common plane.

It may also be advantageous to stagger the spacing of the respective bosses 364a, 364b and correspondingly that of the cutting tool 302 associated therewith they may be placed either behind or forward of the cutting tool 302 in the center boss 364c. That is the cutting tools 302 in the left and right arm bosses 364a, 364b can be located ahead of or behind the cutting tool 302 in the center boss 364b. As used "ahead of" means first in the direction of rotation 34; that is, a cutting tool located ahead of another cutting tool would engage the workpiece or stump first.

FIGS. 38-45 illustrate another example of an embodiment of the present invention of a cutting assembly 12 including tool holders 450a, 450b, 450d, 450e supporting cutting tools 454a-454e. As with the previous embodiments, the tool holders 450a, 450b, 450d, and 450e are similar in that they include a base portion 452 including an outer surface 456 and an inner surface 458 joined by a side surface 460. As with the previous embodiments, the side surface 460 of the two outer tool holders 450a, 450e, that is the two outermost tool holders 450 of the cutting assembly 12 may have various configurations including curved, parabolic beveled or as otherwise identified.

The two outer tool holders 450a, 450e, include apertures 462 464 extending through each of the two outer tool holders 450a, 450e from the outer surface 456 to the inner surface 458. As with the previous embodiments, the aperture 462 includes a smooth bore 468 having a countersunk or counter bored portion 469 while the adjacent aperture 464 has a threaded portion 470. Similar to the previous examples, the two outer tool holders 450a, 450e, are configured such that they cooperate to connect the cutting assembly 12 to the cutting wheel 10.

As with the previous examples, the two outer tool holders 450a, 450e may be identical wherein one outer tool holder 450e is rotated 180° and placed on the opposite side of the wheel 10. The outer tool holders 450a, 450e include a tool portion 472a, 472e including a neck or support portion 474a, 474e having a proximal end 476a, 476e and a distal end 478a, 478e. As illustrated, a boss 480a, 480e is on the distal end 478a, 478e of the support portion 474a, 474e. The boss 480a, 480e includes an aperture 482a, 482e sized to support a cutting tool 454a, 454e. Similar to the previous embodiments the tool holder 70 illustrated in FIG. 10a, the outer tool holders 450a, 450e are symmetrical about a line 484 located at a midpoint between the center lines of the respective apertures 462, 464 of each outer tool holder 450a, 450e. Wherein the midpoint is on a line 486 passing through the respective centerlines 484, 486 and the line is perpendicular to the line passing through the centerlines. The tool holder 450 may be symmetrical about a plane parallel to the centerlines 484, 486 of the first and second apertures 462, 464 in said base portion 450 when said plane is at the midpoint of and perpendicular to a plane passing through the respective center lines 484, 486 of said first and second apertures 462, 464. In one example, the outer tool holder 70 may support the cutting tool 454.

The cutting assembly 10 further includes two interior tool holders 450b, 450d. The two interior tool holders 450b, 450d are sandwiched on respective side surfaces 38, 40 of the wheel 10 between the two outer tool holders 450a, 450e. The two interior tool holders 450b, 450d support three cutting tools 452b, 452c and 452d. The two interior tool holders 450b, 450d are similar in configuration to the tool holders 300 of the previous embodiment in that each of the two interior tool holders 450b, 450d includes a first tool portion 488, 490 extending outwardly from the base 492 portions of each of the two interior tool holders 450b, 450d. Similar to the previous embodiment, the two interior tool holders 450b, 450d cooperate together to support the three cutting tools 452b, 452c and 452d.

Again, as with the previous embodiment illustrated in FIGS. 22-37, the two interior tool holders 450b, 450d have a base 492 including an inner surface 494 and an outer surface 496 interconnected by a side surface 498. A pair of apertures 500, 502 extend through the base 492 between the respective inner and outer surfaces 494, 496. As with previous embodiments, two interior tool holders 450b, 450d are reversible in that they may be rotated 180° and placed on opposite sides of the wheel 10 wherein the outer surface 496 becomes the inner surface 494 on the opposite side of the wheel 10. Since the two interior tool holders 450b, 450d are sandwiched against the wheel by and between the two outer tool holders 450a, 450e, the respective inner and outer surfaces 494, 496 have a generally the same configuration in that the side surface 498 extends generally laterally between the inner and outer surfaces 494, 496.

In another example of the cutting assembly 12 according to the present invention wherein the outer tool holders 450a, 450e support cutting tools 454a, 454e having a different diameter than the cutting tools 454b-d. In the illustrated example, the cutting tips 508a, 508e of the cutting tools 454a, 454e have a greater diameter than the cutting tips 508b-d of the cutting tools 454b-d. Depending upon the cut profile desired along with various other parameters such as the machine size, horsepower, wheel size and width the size including the cutting tip size of the cutting tools 454a-e may be varied. As illustrated, the width of the respective tool holders 450a, 450b, 450d, 450e may also be varied depending upon the desired structural characteristics needed to support the cutting tools 454a-e during the stump cutting or grinding operation.

Similar to the previous example illustrated in FIGS. 22-37 the interior tool holder 450b, 450d includes multiple tool portions including a first boss 510 and a second boss 512. In the disclosed example, the first boss 510 extends generally outwardly from the plane of the outer surface 496 and the second boss 512 extends generally inwardly from the plane of the inner surface 494. The boss 510 is symmetrical, capable of being reversed and mounted on either side 38, 50 of the wheel 10 and supporting a cutting tool 454 inserted from either end 514, 516.

As with the previous example, a ledge 518 is located adjacent an end 520 of the boss 512. The opposite end 522 of the boss 512 configured for receiving the cutting tool 454. Similar to the example in FIGS. 35-36 the two tool holders 450b, 450d may be placed adjacent one another wherein the bosses 512 of the corresponding tool holders 450b, 450d correspond to the adjacent ledges 518 and cooperating to forming a single boss suitable for receiving a cutting tool 384 shown in the disclosed example disposed over the arcuate outer surface 42 of the wheel 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stump cutting apparatus comprising:
   a wheel, said wheel having opposed first and second side surfaces;
   a first inner tool holder removably attached to said first side surface of said wheel, a first outer tool holder stacked directly on top of said first inner tool holder, said first inner tool holder positioned between said first outer tool holder and said first side surface;
   a second inner tool holder removably attached to said second side surface of said wheel opposite said first inner tool holder, a second outer tool holder stacked directly on top of said second inner tool holder, said second inner tool holder positioned between said second outer tool holder and said second side surface;
   said first outer and first inner and second outer and second inner tool holders drawn together in a sandwich against said respective first and second side surfaces of said wheel,
   wherein each of said first outer tool holder, first inner tool holder, second outer tool holder and second inner tool holder includes a respective base portion and a respective tool portion,
   a first inner cutting tool supported in said tool portion of said first inner tool holder,
   a first outer cutting tool supported in said tool portion of said first outer tool holder,
   a second inner cutting tool supported in said tool portion of said second inner tool holder, and
   a second outer cutting tool supported in said tool portion of said second outer tool holder.

2. A stump cutting apparatus as set forth in claim 1 wherein said first outer tool holder includes first and second apertures, said first aperture including a smooth bore and said second aperture including a threaded bore;

said first inner tool holder includes first and second apertures, said first aperture including a smooth bore and said second aperture including a smooth bore;

said second outer tool holder includes first and second apertures, said first aperture including a smooth bore and said second aperture including a threaded bore; and said second inner tool holder including first and second apertures, said first aperture including a smooth bore and said second aperture including a smooth bore.

3. A stump cutting apparatus as set forth in claim 1 wherein said first outer tool holder includes an outer surface and an inner surface;

said first inner tool holder includes an outer surface and an inner surface;

said second outer tool holder includes an outer surface and an inner surface;

said second inner tool holder includes an outer surface and an inner surface wherein said inner surface of said first outer tool holder is positioned adjacent said outer surface of said first inner tool holder and said inner surface of said first inner tool holder is positioned adjacent said wheel and said inner surface of said second outer tool holder is positioned adjacent said outer surface of said second inner tool holder and said inner surface of said second inner tool holder is positioned adjacent said wheel.

4. A stump cutting apparatus as set forth in claim 1 wherein said tool portion of said first outer tool holder is offset from said base portion of said first outer tool holder.

5. A stump cutting apparatus as set forth in claim 1 wherein said tool portion of said first inner tool holder is in line with said base portion of said first inner tool holder.

6. A stump cutting apparatus as set forth in claim 1 wherein each said tool portion of the respective said first inner and first outer and second inner and second outer tool holders includes a boss, each boss including an aperture therein; and each of said respective first inner and first outer and second inner and second outer cutting tools having a shank and a cutting tip, wherein each said shank is located in a respective said aperture of the respective said boss of each of said tool holders.

7. A stump cutting apparatus as set forth in claim 6 wherein the respective cutting tips of each of said first outer cutting tool, first inner cutting tool, second outer cutting tool and said second inner cutting tool all lie in the same plane.

8. A stump cutting apparatus as set forth in claim 1 wherein said first outer tool holder and said second outer tool holder are each symmetrical about a respective centerline such that the first outer tool holder and the second outer tool holder may be inverted for placement on either of said side surfaces the wheel.

9. A stump cutting apparatus as set forth in claim 1 wherein said first inner tool holder and said second inner tool holder are each symmetrical about a centerline such that the inner tool holder may be inverted for placement on either of said side surfaces of the wheel.

10. A stump cutting apparatus as set forth in claim 6 wherein said cutting tips of said first and second inner cutting tools are located at a different distance from said axis of rotation than said cutting tips of said first and second outer cutting tools.

11. A stump cutting apparatus as set forth in claim 1 wherein said first outer cutting tool is supported laterally outwardly of said first side surface;

said second outer cutting tool is supported laterally outwardly of said second side surface;

said first inner cutting tool is supported laterally inwardly from said first outer cutting tool; and said second inner cutting tool is supported laterally inwardly from said second outer cutting tool.

12. A stump cutting apparatus as set forth in claim 1 wherein said first outer cutting tool is spaced at a different radial distance from the axis of rotation relative to said first inner cutting tool.

* * * * *